United States Patent [19]
Shimomura et al.

[11] Patent Number: 5,515,503
[45] Date of Patent: May 7, 1996

[54] SELF-REPAIR SYSTEM FOR AN IMAGE FORMING APPARATUS

[75] Inventors: Yoshiki Shimomura, Yawata; Hiroyuki Yoshikawa, Tokyo; Tetsuo Tomiyama, Chiba; Yasushi Umeda, Tokyo, all of Japan

[73] Assignee: Mita Industrial Co., 2-28, Japan

[21] Appl. No.: 948,580

[22] Filed: Sep. 23, 1992

[30] Foreign Application Priority Data

Sep. 30, 1991 [JP] Japan ..................... 3-250043

[51] Int. Cl.6 .................................................. G06F 11/00
[52] U.S. Cl. ........................ 395/183.02; 395/902
[58] Field of Search ................... 371/16.4, 29.1, 371/3, 5.1, 11.1, 15.1, 23; 395/911, 912, 916, 575, 183.02, 902; 391/1

[56] References Cited

U.S. PATENT DOCUMENTS

| | | | |
|---|---|---|---|
| 4,514,846 | 4/1985 | Federico | 371/16 |
| 4,583,834 | 4/1986 | Seko et al. | 355/140 |
| 4,896,278 | 1/1990 | Grove | 364/46 |
| 4,964,125 | 10/1990 | Kim | 371/15.1 |
| 5,010,551 | 4/1991 | Goldsmith | 371/16.4 |
| 5,023,817 | 6/1991 | Au | 364/550 |
| 5,090,014 | 2/1992 | Polich | 371/15.1 |
| 5,099,436 | 3/1992 | McCown | 364/550 |
| 5,107,497 | 4/1992 | Lirov et al. | 371/15.1 |
| 5,115,177 | 5/1992 | Tanaka | 318/568.1 |
| 5,130,936 | 7/1992 | Sheppard | 364/551.01 |
| 5,164,912 | 11/1992 | Osborne et al. | 364/580 |
| 5,166,934 | 11/1992 | Tomiyama | 371/16.4 |
| 5,168,147 | 12/1992 | Bloomberg | 235/456 |
| 5,187,773 | 2/1993 | Hamilton | 395/10 |
| 5,210,704 | 5/1993 | Husseiny | 364/551.01 |
| 5,239,547 | 8/1993 | Tomiyama | 371/16.4 |
| 5,239,637 | 8/1993 | Davis | 395/425 |

OTHER PUBLICATIONS

IBM Technical Disclosure Bulletin (carusone) vol. 21 No. 11 Apr. 1979 "Automatic Diagnostics".
"Diagnosis of Faults in Linear Tree Networks" (Seth) IEEE Transactions on Computers vol. 126 No. 1 Jan. 1977.
"Mind: An Inside Look at an Expert System for Electronic Diagnosis" (Wilkinson) IEEE Design and Test Conference Aug. 1985.

Primary Examiner—Robert W. Beausoliel, Jr.
Assistant Examiner—Ly V. Hua
Attorney, Agent, or Firm—Beveridge, DeGrandi, Weilacher & Young

[57] ABSTRACT

The present invention makes it possible to effectively make self-repair of a fault by referencing repair analysis cases. The cases are hierarchically classified according to the fault symptom, the fault and the class, and a case suitable for a fault developed is selected to perform repair work. In applying a case, the case is corrected as required. If work succeeded by the corrected case, the corrected case is registered in the same class as a class to which the original case belongs, to make each class rich in case contents.

41 Claims, 25 Drawing Sheets

PARAMETER X   0 LOW  20 NORMAL  23 HIGH

PARAMETER Vs   LOW  750 NORMAL  760 HIGH

PARAMETER Os   LOW  8 NORMAL  15 HIGH

PARAMETER Vn   LOW  600 NORMAL  800 HIGH

SELF-REPAIR SYSTEM FOR AN IMAGE FORMING APPARATUS

BACKGROUND OF THE INVENTION

1. Field of the Invention

The present invention relates generally to an image forming apparatus having a self-repair system. More particularly, it relates to an image forming apparatus so adapted as to allow (self-diagnosis of the operating state and the like and) self-repair to be made utilizing artificial intelligence and knowledge engineering which have been studied extensively in recent years.

2. Description of the Prior Art

In the development field of precision instruments, industrial machines and the like, expert systems utilizing artificial intelligence (so-called AI) techniques have been studied extensively in recent years for the purpose of realizing labor saving in maintenance work and long-term automatic operation. The expert systems include one for making a self-diagnosis to judge whether or not an apparatus develops a fault and for making self-repair of the fault developed.

However, the conventional expert system (an automatic control system and a fault diagnosis system) is so adapted as to basically operate an actuator corresponding to a sensor on the basis of an output of the sensor. That is, one type of automatic control and fault diagnosis has been made by a predetermined combination of a sensor and an actuator. Accordingly, a certain sensor basically corresponds to a particular actuator, and the relationship therebetween has been stationary. Therefore, the conventional expert system has the following disadvantages:

(1) The relationship between parameters of the sensor and parameters of the actuator must be clearly expressed numerically.

(2) From the reason mentioned in the above described item (1), the relationship between parameters of the sensor and parameters of the actuator depends largely on an object. Accordingly, the conventional expert system is lacking in versatility, that is, it cannot be utilized for a variety of objects.

(3) The relationships between parameters of respective sensors and between parameters of respective actuators have no relation to control. Consequently, only simple control based on only the relationship between parameters of the sensors and parameters of the actuators which correspond to each other can be carried out, and faults which can be coped with are previously restricted so that unknown faults cannot be handled.

(4) From the reason mentioned in the above described item (3), secondary effects exerted on parameters of other actuators which might be caused by the operation of an arbitrary actuator can not be anticipated.

Thus, in the conventional automatic control system and fault diagnosis system, only fault diagnosis based on sets respectively including independent sensors and actuators and fault repair based on the fault diagnosis have been made in such a manner that forecasting fault A is made on the basis of a set A of a sensor A and an actuator A, forecasting fault B is made on the basis of a set B of a sensor B and an actuator B, and forecasting fault C is made on the basis of a set C of a sensor C and an actuator C.

The applicant of the present application applied for a patent in connection with a new self-diagnosis and self-repair system for an image forming apparatus in which the disadvantages of the conventional system are overcome (see, for example, U.S. patent application Ser. No. 07/588, 177).

The self-diagnosis and self-repair system for an image forming apparatus according to the prior application has two large features.

One of the features is that an objective machine is qualitatively expressed using parameters and fault diagnosis of the objective machine is made using the qualitative data, that is, fault diagnosis based on a qualitative model based system (hereinafter referred to as QMS) is made.

The other one is as follows: If QMS processing is performed, the results of fault diagnosis are hierarchically classified according to the "fault symptom" and the "fault", so that the results of the classification are stored as cases. Further, in many instances, common repair work is performed for a plurality of cases belonging to the same fault symptom and fault, so that work required for repair is expressed as the minimum unit in the rule form. A set of work units is registered as a work script, and is shared among the plurality of cases belonging to the fault symptom and the fault. A case based planning system (hereinafter referred to as "CBS") is generated utilizing a case base thus obtained. As a result, a case to which the current fault symptom and fault apply is selected from the cases hierarchically classified according to the fault symptom and the fault, and repair work is performed on the basis of the selected case and a work script corresponding to the case.

Meanwhile, in the prior invention, cases in the CBS are classified according to the "fault symptom" and the "fault". However, it is considered that the cases can be classified more finely. When a certain case is referred to, resulting in failure, the selection of a case belonging to the same class as a class to which the unsuccessful case belongs should be avoidable to improve the rate of success concerning selection of cases by classifying the cases more finely.

The inventors of the present application have paid attention to the detailing concerning classification of classes, to complete the present invention.

SUMMARY OF THE INVENTION

Briefly stated, an object of the present invention is to provide an image forming apparatus having a system capable of executing self-repair work more rapidly by improving the rate of success concerning selection of cases in a CBS.

According to the present invention, it is judged whether or not the image forming apparatus develops a fault. If a fault is developed, an inference of the fault symptom, the fault causes, and the state of the apparatus is drawn. A plurality of cases previously stored are retrieved on the basis of the results of the inference, to detect a case most suitable for fault repair, so that fault repair processing based on the case is performed.

In the fault repair processing based on the case, a case corresponding to a fault is selected out of cases classified into classes and stored, to be applied to fault repair. Accordingly, a suitable case can be applied rapidly. In addition, when the case cannot be directly applied, the case is applied after being corrected. When the fault repair succeeds based on the corrected case, the corrected case is registered as a new case in the same class as a class to which the case which was a basis belongs. Accordingly, every time the fault repair succeeds, it is possible to increase the number of cases belonging to the same class, making each class rich in case contents, and cause the subsequent fault repair to achieve flexibility.

Furthermore, according to the present invention, the fault is based on qualitative data common to image forming apparatuses. Accordingly, there can be provided an image forming apparatus having a self-diagnosis and self-repair system capable of handling unknown faults which are not clearly expressed.

Additionally, a self-diagnosis and self-repair system according to the present invention can be applied not to a particular image forming apparatus but to a lot of types of image forming apparatuses. As a result, there can be provided an image forming apparatus having a low-cost self-diagnosis and self-repair system.

Solution to the problems

In an image forming apparatus according to the present invention, cases mentioning work for repairing a fault are classified into classes and stored. It is judged whether or not cases belong to the same class depending on whether or not the cases are within a range in which they can be qualitatively reached from each other.

When the image forming apparatus develops a fault, a case corresponding to the fault, for example, a case in which the degree of coincidence of state parameters is high is selected, to be applied to fault repair. When the selected case cannot be directly applied to the fault repair, work mentioned in the case is corrected by case correcting means. As a result, when repair work succeeds by applying the corrected case, it is judged that the corrected case and a case which was a basis before the correction are within a range in which they can be qualitatively reached from each other, so that the corrected case is registered in a class to which the case which was a basis belongs.

Detailing of work scripts

An image forming apparatus according to the present invention basically has a CBS. Although the basic construction of the CBS is disclosed in the prior application of the applicant, it will be also described in detail later in the specification of the present application.

In the CBS, a "work script" mentioned in the rule form is defined as a method of expressing an operation serving as the minimum unit of actual repair work, as described above. An operation of "detailing of a work script" is introduced for the purpose of amplifying a case. "Detailing of a work script" is to subject a work script to a logical operation based on a hypothesis and inference, and is an operation of finding out the difference between the condition of a case and the present condition and removing the difference to make the present condition qualitatively equal to the condition of the case.

The foregoing will be described more concretely. As shown in FIG. 1, in a two-dimensional space represented by, for example, a parameter A and a parameter B, a portion within a circle indicated by FS shall be a parameter space where an apparatus is in a normal state. In a case 1, a state position represented by a parameter A and a parameter B is CS1, where an apparatus develops a fault. The state position CS1 in the case 1 is moved into the normal parameter space FS by subjecting the state position CS1 to repair work C1R mentioned in a work script, so that the repair work succeeded.

In a case 2, a state position represented by a parameter A and a parameter B is CS2. The state position CS2 in the case 2 can be moved into the normal parameter space FS by subjecting the state position CS2 to repair work C2R mentioned in the work script.

The repair work C1R mentioned in the work script is repair work effective for a case where the condition of the case is in the position indicated by CS1. Similarly, the repair work CR2 mentioned in the work script is repair work effective for a case where the condition of the case is in the position indicated by CS2.

Meanwhile, when the present condition of a fault newly diagnosed is in a position indicated by CS3, the repair work C1R and the repair work C2R mentioned in the work script cannot be directly applied. Therefore, an operation C3R1 for finding out the difference between the present condition CS3 and the condition CS1 in the case 1 and moving the condition CS3 to the condition CS1 is added to the work script. This is "detailing of a work script". Alternatively, repair work C3R2 for moving the present condition CS3 to the condition CS2 in the case 2 is added to the work script. This is also "detailing of a work script". If the present condition CS3 can be moved to, for example, the condition CS1 in the case 1, the condition CS1 can be moved into the parameter space FS where the apparatus is in a normal state by applying the repair work C1R.

If the present condition CS3 can be moved to the condition CS1 in the case 1 by performing the repair work C3R1 and the condition CS1 can be moved into the parameter space FS by performing the repair work C1R, it means that the case is successfully referred to by detailing the work script. In this case, therefore, it is considered that the condition in which the case is successfully referred to by detailing the work script, that is, the present condition CS3 and the original case, that is, the condition CS1 in the case 1 are within the same range in which they can be qualitatively reached from each other. Cases within the same range in which they can be qualitatively reached from each other are defined as ones belonging to the same class.

On the other hand, when attempts to move the present condition CS3 to the condition CS2 in the case 2 fail, the present condition CS3 and the condition CS2 in the case 2 are originally in the relationship in which they cannot be qualitatively reached from each other. Therefore, cases in this relationship are defined as ones belonging to different classes. Further, in a certain condition, a case which is unsuccessfully referred to and a case which is successfully referred to are defined as ones belonging to different classes because they cannot be qualitatively reached from each other. Furthermore, a case newly created by the QMS after all cases are unsuccessfully referred to is defined as one belonging to a class different from classes to which all the cases belong because it cannot be qualitatively reached from all the cases.

In the CBS according to the prior invention of the applicant, cases are hierarchically classified according to the "fault symptom" and the "fault", as shown in FIG. 2. On the other hand, in the present invention, cases are classified in more detail and are hierarchically classified according to the "fault symptom", the "fault" and the "class", as shown in FIG. 3, as a result of the above described definition.

Description is now made of a concrete example in which cases are classified.

Description is made with reference to FIG. 4. It is assumed, as an example, that five cases CS1 to CS5 exist. CS1, CS3 and CS4 shall be cases to be applied to repair which are created by the QMS, and CS2 and CS5 shall be respectively cases obtained from CS1 and CS4 through detailing based on inference of cases. In this instance, the five cases are classified into three classes [CS1, CS2], [CS3], and [CS4 and CS5].

When the cases are referred to in an arbitrary condition S, priorities concerning the reference of cases are assigned to the cases in the order in which it is considered that the respective qualitative distances between the condition S and the conditions in the cases are increased. It is assumed here that the order of priority is CS2, CS1, CS4, CS3, and CS5. At this time, the case CS2 is first referred to. When the case CS2 is unsuccessfully referred to, the case CS1 is not referred to. The reason for this is that the case CS2 is unsuccessfully referred to because it is judged that the condition S given is not in a range in which it can be qualitatively reached from the case CS2 and it is considered that the same is true for the case CS1 belonging to the same class as the class to which the case CS2 belongs. Consequently, when reference of all the cases fails, the reference is in the order of CS2, CS4 and CS3.

The rate of success concerning selection of a case to be referred to can be raised by introducing the concept of the "class" into the classification of cases and detailing the classification of the cases. In addition, time required to select the case can be shortened.

Meanwhile, as shown in FIG. 3, sets of cases are classified for each class in the present invention. The cases belonging to the same class are within a range in which they can be qualitatively reached from each other. Accordingly, the case CS1 and the case CS4, for example, are in the relationship in which they cannot be qualitatively reached from each other. Therefore, it is not natural that such cases in the relationship in which they cannot be qualitatively reached from each other (for example, CS1 and CS4) share the same set of work scripts. In the present invention, therefore, sets of cases belonging to different classes shall be respectively assigned to different sets of work scripts. That is, as shown in FIG. 5, a set of cases in the relationship in which they can be qualitatively reached from each other share a set of work scripts.

From another point of view, it is considered that cases in the relationship in which they cannot be qualitatively reached from each other differ in the fundamental cause of a fault. Accordingly, such multiplexing of sets of work scripts that a set of work scripts is assigned to cases belonging to a common class can be considered as work for separating sets of work scripts depending on the fundamental cause of the fault.

Furthermore, in the present invention, cases belonging to the same fault symptom and fault and belonging to different classes are moved up in the order of priority for application of cases on the basis of the similarity of the classes so as to improve case retrieval efficiency.

The cases are hierarchically classified according to the "fault symptom" and the "fault" which are the results of the fault diagnosis based on the QMS. In addition, the cases are classified for each "class" in the process in which repair based on inference of cases is repeated. Therefore, work for classifying the cases for each "class" causes the classification of the "fault" in the fault diagnosis to be made finer.

Meanwhile, the "class" is considered as the relationship between states in positions which cannot be qualitatively reached from each other and the difference in the fundamental cause of the fault, as described above. When the actual mechanical system is considered, however, different fault symptoms appear in many cases, although the fault is due to the same fundamental cause. If a copying machine is taken as an example, a fault symptom "a reset occurs" may, in some cases, appear and a fault symptom "a picture image is distorted" may, in another case, appear even if the fault is due to the same fundamental cause. For example, there are cases such as a case where "although fog is generated if a principal charge voltage is increased, a charge current leaks to a drum so that a reset occurs" and a case where "although fog is generated if a principal charge voltage is increased, a charge current leaks to a drum so that a picture image is distorted". In addition, the frequency of the fault symptom appearing due to the same cause of the fault is high unless the fundamental cause of the fault is removed.

As a result of success in repair made by applying cases belonging to a certain class with respect to a certain fault symptom, therefore, it is considered that the possibility that proper repair work is obtained is high if cases belonging to similar classes are applied with respect to different fault symptoms. Therefore, in a case where repair made by applying cases belonging to a certain class with respect to a certain fault symptom succeeds, if there are cases belonging to a class similar to the class to which the cases which are applied to repair belongs out of cases belonging to a different fault symptom, processing for moving up the cases in the order of priority concerning application of cases is performed.

That is, the classification according to the "class" "exceeds a category" obtained by the classification based on the QMS such as the "fault symptom" and the "fault". Accordingly, cases concerning different fault symptoms may, in some cases, be similar in "class". The similarity in "class" means that cases belonging to each of the classes have common characteristics.

Specifically, the characteristics of a class are extracted by extracting a common part from the "condition before repair" in cases belonging to the class, as described in detail in the following "DESCRIPTION OF THE PREFERRED EMBODIMENTS". Cases belonging to classes concerning different fault symptoms are compared with each other. If the "conditions before repair" in all the cases included in the respective classes have common characteristics, it is judged that the classes are similar to each other, to perform processing for moving up the cases in the order of priority concerning application of cases.

For example, consider a case where the characteristic of a set of cases A is P and the characteristic of a set of cases B is Q, as shown in FIG. 6. In this instance, when Q contains P (P∈Q), it is judged that the set of cases A is similar to the set of cases B. Here, however, the set of cases B is not necessarily similar to the set of cases A (Q∈P does not necessarily hold).

Cases are moved up in the order of priority concerning application of cases by such similarity in class, thereby to make it possible to improve the rate of success for application of cases as a whole in repair to which the cases are applied.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Outline of system configuration

Figure 1:
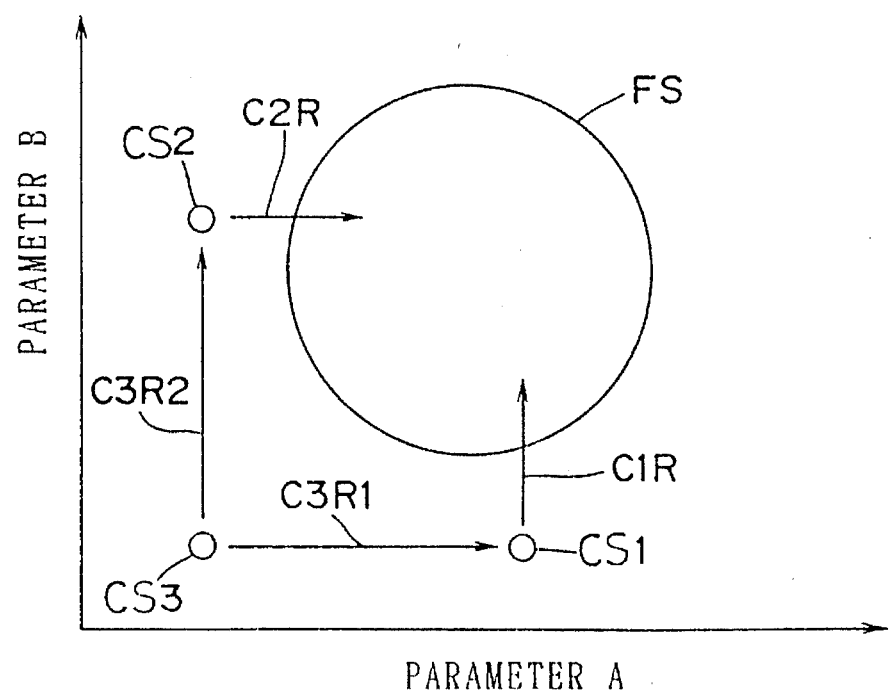
FIG. 1 diagram for explaining "detailing of a work script" in the present invention.
Figure 2:
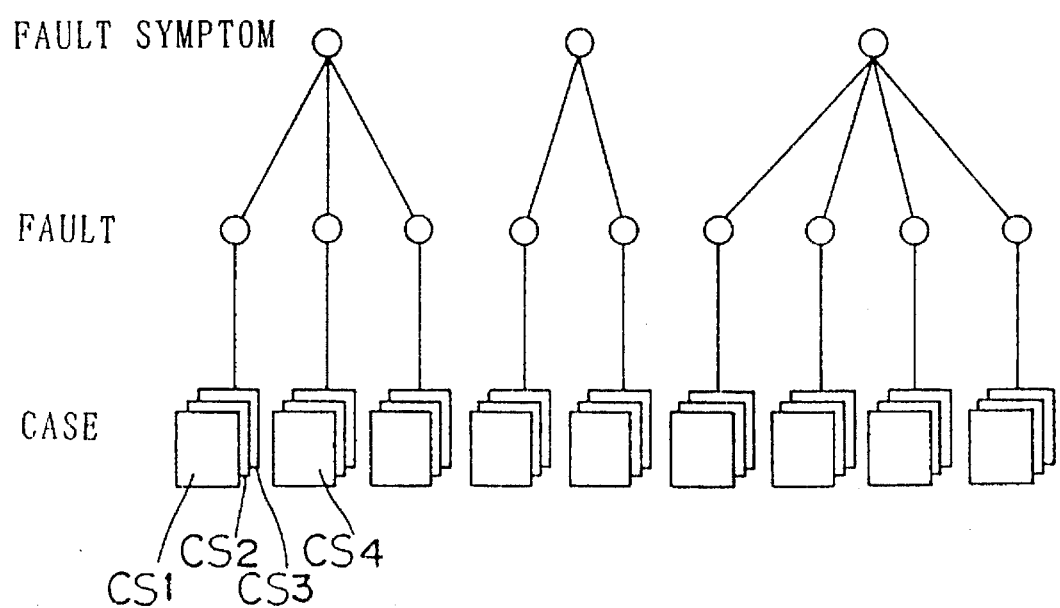
FIG. 2 is an illustration for explaining a method of classifying cases in a case based planning system according to the prior invention.
Figure 3:
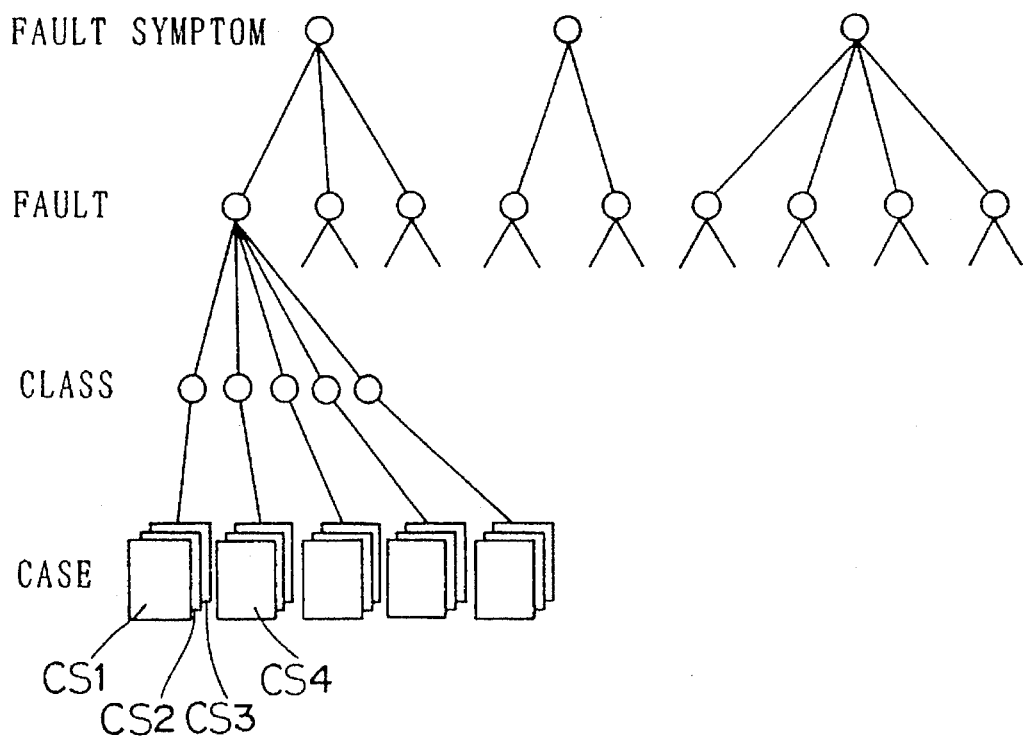
FIG. 3 is an illustration for explaining a method of classifying cases in a case based planning system according to the present invention.
Figure 4:
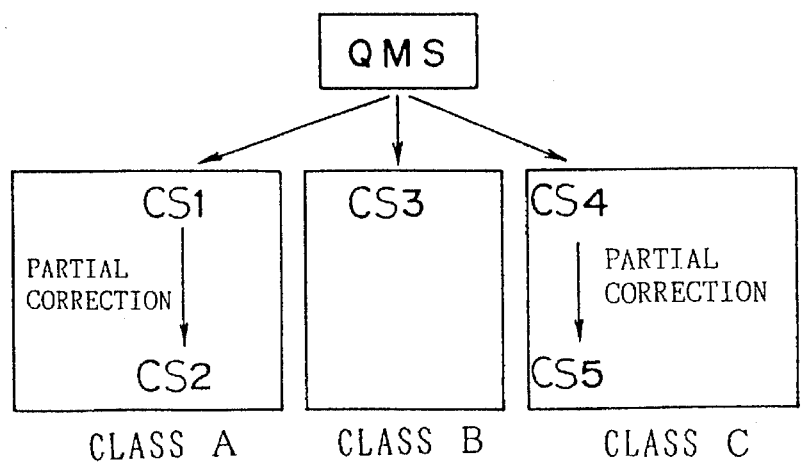
FIG. 4 is a diagram for explaining a method of classifying cases, in a case where the concept of the "class" is introduced for the classification of cases, into classes.
Figure 5:
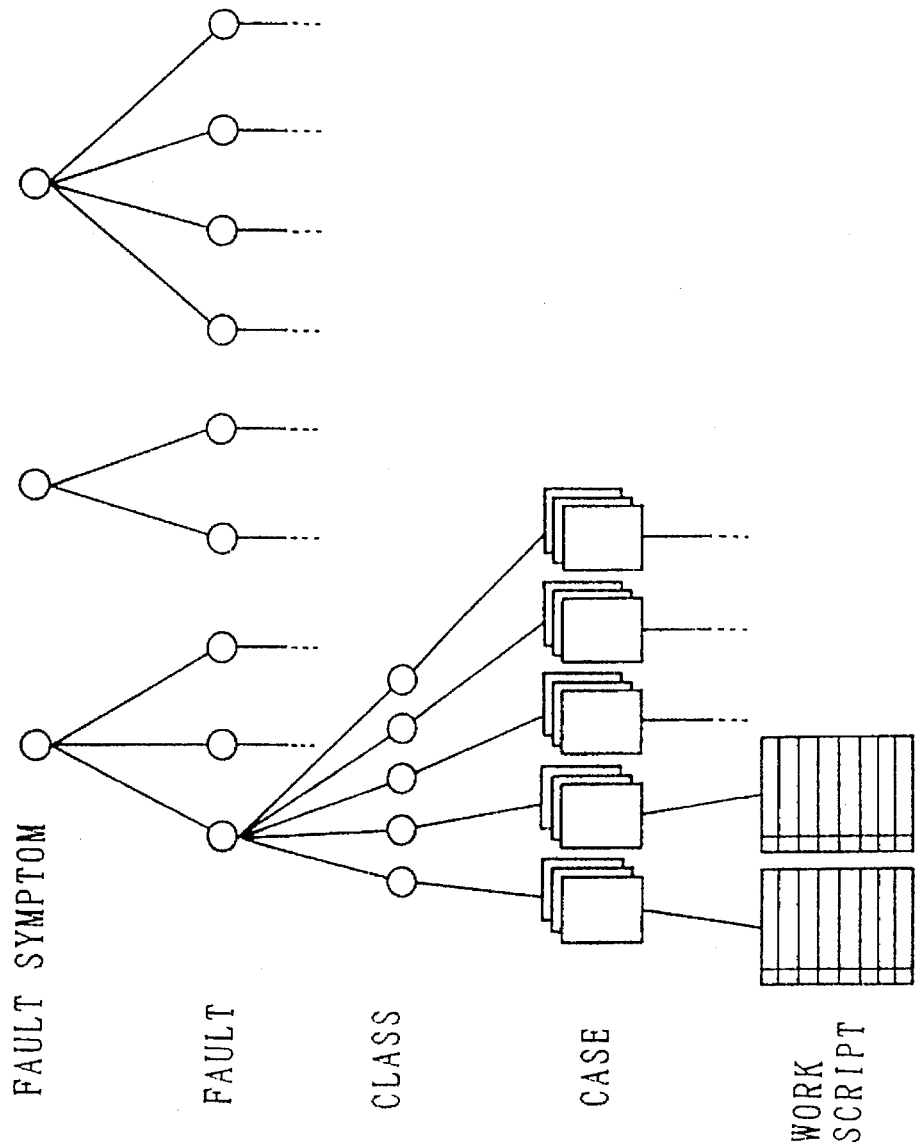
FIG. 5 is an illustration showing the relationship between cases classified into classes and work scripts.
Figure 6:
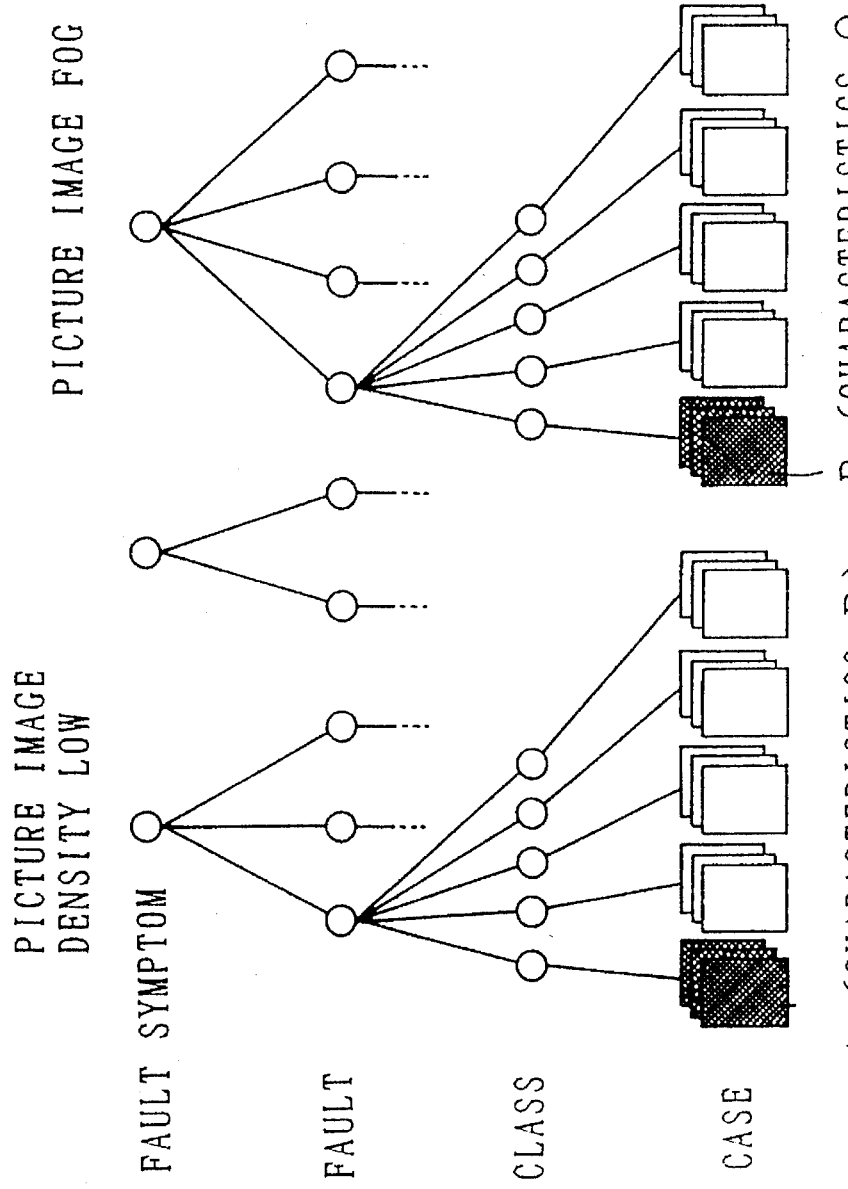
FIG. 6 is an illustration for explaining the conditions under which a set of cases A and a set of cases B belonging to different fault symptoms are similar to each other.
Figure 7:
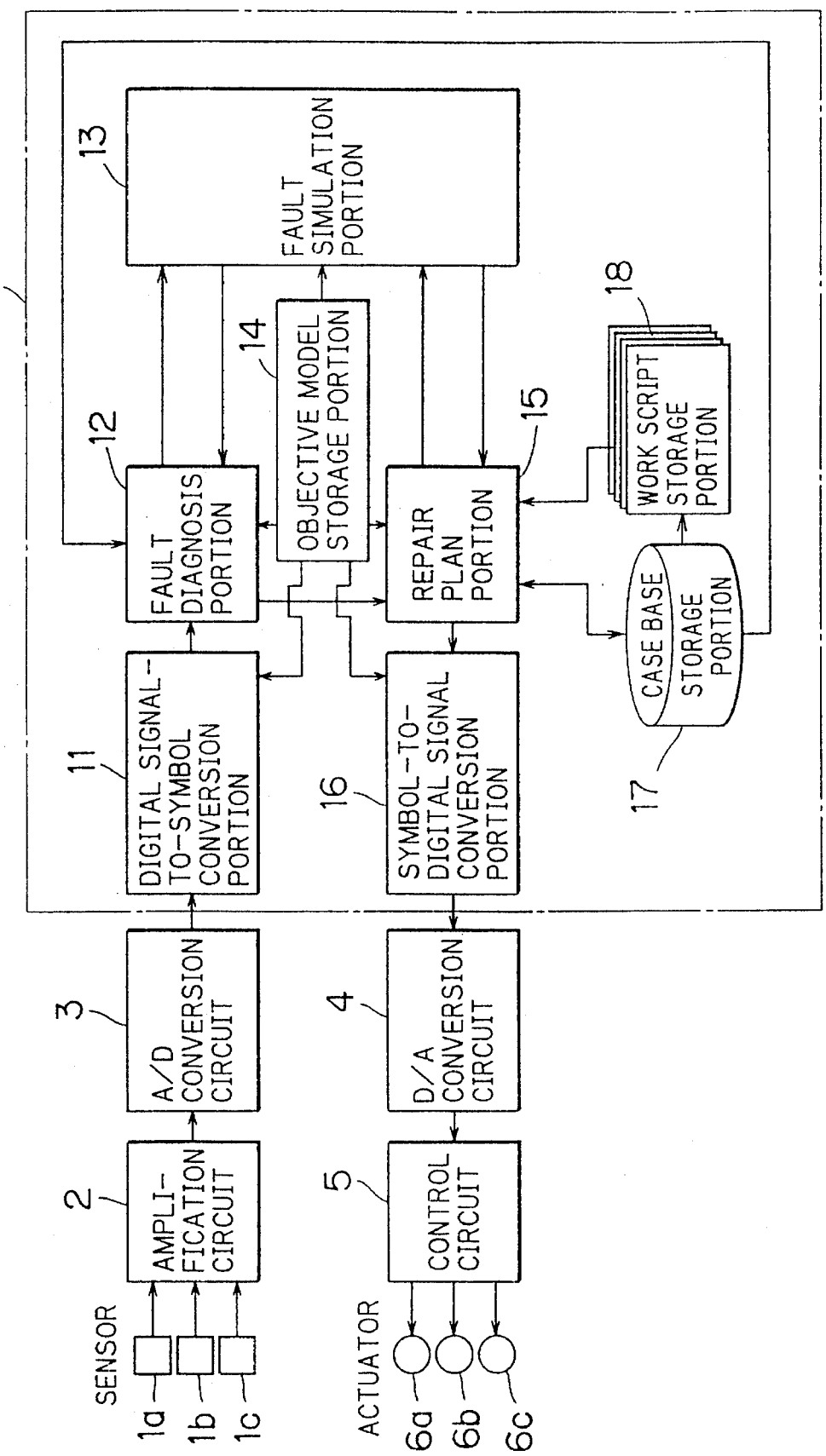
FIG. 7 is a block diagram showing the system configuration according to one embodiment of the present invention.

FIG. 7 is a block diagram showing the system configuration according to one embodiment of the present invention. This system comprises a plurality of sensors $1a$, $1b$ and $1c$ located on an image forming apparatus which is an objective machine and a plurality of actuators $6a$, $6b$ and $6c$ for changing function states or the like of the objective machine.

The plurality of sensors $1a$, $1b$ and $1c$ are respectively used for detecting the change of elements of the objective machine or relevant states among the machine elements which occurs by the operation of the objective machine. Information which is taken in from the plurality of sensors $1a$, $1b$ and $1c$, respectively, is amplified by an amplification circuit 2, converted from analog signals to digital signals by an A/D conversion circuit 3, and applied to a system control circuit 10.

The system control circuit 10 comprises a digital signal-to-symbol conversion portion 11, a fault diagnosis portion 12, a fault simulation portion 13, an objective model storage portion 14, a repair plan portion 15, and a symbol-to-digital signal conversion portion 16. In addition, a case base storage portion 17 and a work script storage portion 18 are connected to the repair plan portion 15.

The digital signal-to-symbol conversion portion 11 is used for converting the digital signal applied from the A/D conversion circuit 3 into qualitative information, that is, it has the converting function for converting the digital signal into any one of three symbols, for example, "normal", "high" and "low". The signals applied from the sensors $1a$, $1b$ and $1c$ are converted into such qualitative information symbols, thereby to make it easy to make an approach to fault diagnosis. The symbols are not limited to "normal", "high" and "low" in this example. For example, the symbols may be other expressions such as "on" and "off" or "A", "B", "C" and "D". When the digital signal is converted into a symbol in the conversion portion 11, characteristic data intrinsic to the objective machine which is stored in the objective model storage portion 14 is referred to. The details of this characteristic data and the signal conversion will be described later.

The fault diagnosis portion 12 and the fault simulation portion 13 constitute a composition portion for judging whether or not a fault exists and making fault diagnosis by comparing the symbol obtained by the conversion in the digital signal-to-symbol conversion portion 11 with fault diagnosis knowledge stored in the objective model storage portion 14 and consequently, representing the fault state of the objective machine by the qualitative information, that is, the symbol and outputting the same.

The repair plan portion 15, the case base storage portion 17 and the work script storage portion 18 constitute a composition portion for making an inference in a repair plan and deriving repair work on the basis of the "fault symptom" and the "fault" which are the results of the diagnosis of, if a fault exists, the fault. In making an inference in the repair plan and deriving the repair work, a case concerning past success in repair which is stored in the case base storage portion 17 is retrieved, and a work script for executing the case retrieved (which is one for expressing an operation serving as the minimum unit of the repair work and is a series of work units for performing a repair operation mentioned in the rule form, as described in detail later) is selected from the work script storage portion 18. In addition, qualitative data (as described in detail later) which is stored in the objective model storage portion 14 is made use of.

The repair work output from the repair plan portion 15 is converted into a digital signal in the symbol-to-digital signal conversion portion 16 by referring to the information stored in the objective model storage portion 14.

The digital signal is converted into an analog signal in a D/A conversion circuit 4 and applied to an actuator control circuit 5. The actuator control circuit 5 selectively operates the plurality of actuators 6a, 6b and 6c to perform repair work on the basis of the analog signal applied, that is, an actuator control instruction.

Outline of the operation of the system

Figure 8:
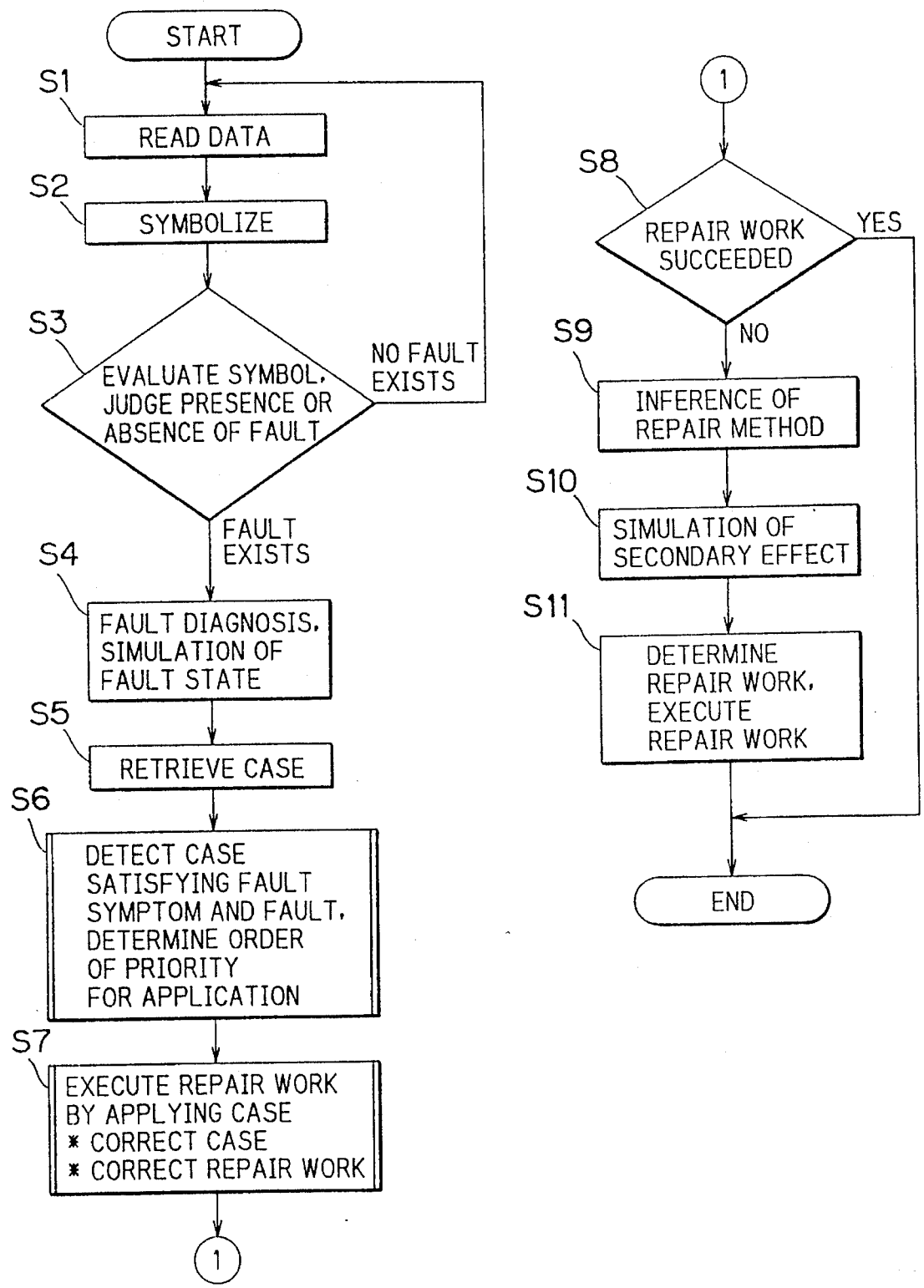
FIG. 8 is a flow chart showing the outline of a processing operation of a system control circuit shown in FIG. 7.

FIG. 8 is a flow chart showing the processing of the system control circuit 10 shown in FIG. 7. Referring now to FIG. 8, the outline of the processing of the system control circuit 10 shown in FIG. 7 will be described.

A detection signal of the sensor 1a, 1b or 1c is amplified and converted into a digital signal, to be read in the system control circuit 10 for each predetermined read cycle, for example (step S1). The digital signal read is symbolized in the digital signal-to-symbol conversion portion 11 (step S2). This symbolization is achieved on the basis of the characteristic data, that is, reference value data intrinsic to the objective machine which is previously set in the objective model storage portion 14. For example, the output ranges of the respective sensors 1a, 1b and 1c are set as follows as the reference value data intrinsic to the objective machine in the objective model storage portion 14.

That is:

sensor 1a:
  output of less than $ka_1$=low
  output of $ka_1$ to $ka_2$=normal
  output of more than $ka_2$=high sensor 1b:
  output of less than $kb_1$=low
  output of $kb_1$ to $kb_2$=normal
  output of more than $kb_2$=high sensor 1c:
  output of less than $kc_1$=low
  output of $kc_1$ to $kc_2$=normal
  output of more than $kc_2$=high In the digital signal-to-symbol conversion portion 11, each of the digital signal read is converted into a symbol, for example, "low", "normal" or "high" on the basis of the reference value data intrinsic to the above described objective machine which is set in the objective model storage portion 14.

The symbol obtained by the conversion is then evaluated in the fault diagnosis portion 12, to judge whether or not a fault exists and to specify a fault symptom (step S3). The fault diagnosis knowledge stored in the objective model storage portion 14 is used so as to judge whether or not a fault exists and to specify a fault symptom by the evaluation of the symbol. The fault diagnosis knowledge is, for example, the set condition that a particular parameter must be, for example, "normal". If the particular parameter is not "normal", it is judged that a fault exists and a fault symptom is specified depending on what the particular parameter is. If no fault exists, the routine of steps S1, S2 and S3 is repeated.

If it is judged in step S3 that a fault exists, an inference of the state of the objective machine is drawn, that is, fault diagnosis and simulation of the fault state are made (step S4).

Specifically, a parameter which causes a fault is retrieved in the fault diagnosis portion 12 on the basis of qualitative data qualitatively representing behaviors or attributes of respective elements constituting an apparatus and the combinational relationship between the elements which are stored in the objective model storage portion 14, and simulation of the fault state is made in the fault simulation portion 13 on the assumption that the parameter retrieved is the fault. Further, in the fault diagnosis portion 12, the result of the simulation is compared with the present value of the parameter, and the justification of the assumption that the parameter retrieved is the fault is judged. The foregoing processing is performed with respect to all of a plurality of parameters to be retrieved.

As a result of the judgment whether or not a fault exists, the fault diagnosis and the simulation of the fault state, the "fault symptom" and the "fault" of the objective machine are determined. The "fault symptom" means the change in the output condition or the like of the objective machine (for example, "lightly printed copy" or the like in a copying machine taken as an example), and the "fault" means the change in the mechanism and structure of the objective machine which causes the change of a symbol (for example, "decrease in halogen lamp quantity of light" in a copying machine).

A lot of cases stored in the case base storage portion 17 are then retrieved by the repair plan portion 15 on the basis of the results of the fault diagnosis and the simulation of the fault state (step S5). A case close to the present state of the objective machine is detected, so that the order of priority for application is determined (step S6). This detection of the case is performed depending on whether the fault symptom and the fault respectively coincide with those in the present state of the objective machine. Furthermore, in the determination of the order of priority for application, when there are a plurality of cases belonging to the same class, only a case assigned the highest priority is applied.

Repair work based on the case assigned the priority for application is executed (step S7). In the repair work, the case and the repair work are corrected, that is, the work script is detailed, as required. The corrected case is registered as a new case belonging to the same class.

If the repair work based on the case succeeded, the processing is terminated (YES in the step S8). On the other hand, if the repair work based on the case did not succeed (NO in the step S8), an inference of a repair method using the QMS is drawn (step S9). In addition, simulation of secondary effects is made (step S10), and a repair plan is determined and repair work based on the determination is performed (step S11).

The inference and the execution of the work in steps S9 to S11 utilize not cases in the CBS but the QMS. When the repair work based on the inference using the QMS succeeds, however, the result of the repair is registered as a new case belonging to another class in the case base storage portion 17.

A method of the fault diagnosis and fault repair will be described in detail with reference to a concrete example. In the following, a method taking the peripheral portion of a photosensitive drum in a small-sized plain paper copying machine as an objective machine will be described by way of example.

Construction and state of specific objective machine

Figure 9:
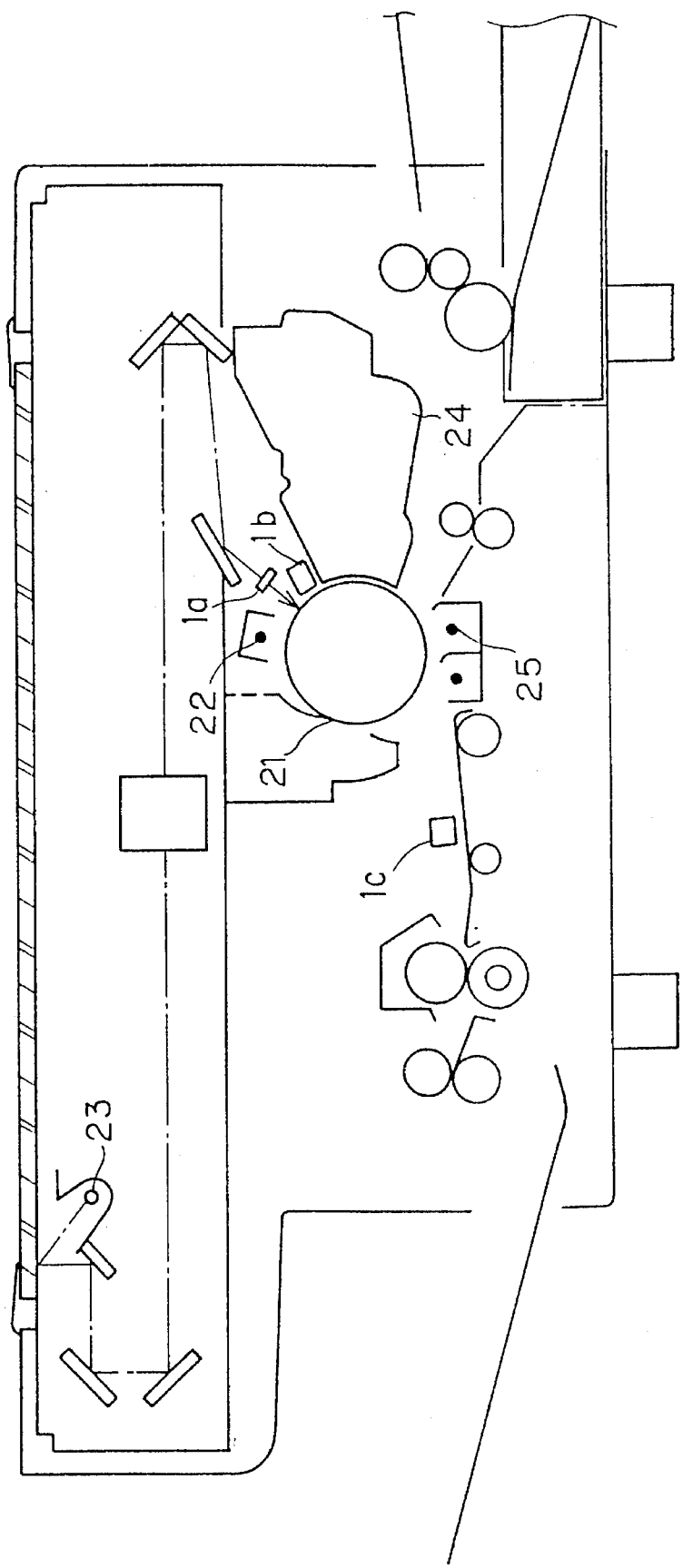
FIG. 9 is a diagram for explaining the schematic construction of a small-sized plain paper copying machine according to one embodiment of the present invention and three sensors provided for the copying machine.

FIG. 9 is an illustration showing a specific objective machine. In FIG. 9, reference numeral 21 designates a photosensitive drum, reference numeral 22 designates a principal electro static charger, reference numeral 23 designates a halogen lamp for copy illumination, reference numeral 24 designates a developing device, and reference numeral 25 designates a transfer charger.

In the present embodiment, three sensors 1a, 1b and 1c are provided, for example. That is, the sensor 1a is an AE sensor for measuring the quantity of light exposing the photosensitive drum 21, the sensor 1b is a surface potential sensor for measuring a surface potential of the photosensitive drum 21, and the sensor 1c is a densitometer for measuring the density of a picture image copied on paper.

Furthermore, three types of actuators are provided, which are not shown in FIG. 9. That is, three volumes, a principal charge volume VR1 for changing a principal charge voltage of the photosensitive drum 21, a lamp volume AVR for controlling the quantity of light of the halogen lamp 23, and a transfer volume VR2 for controlling a transfer voltage between the photosensitive drum 21 and copy paper (a transfer voltage of the transfer charger are provided as the actuators.

Additionally, a system control circuit 10 which is the same as that shown in FIG. 7 is connected to the three sensors 1a, 1b and 1c shown in FIG. 9 and the three actuators.

Substance model and objective model

Meanwhile, when the objective machine shown in FIG. 9 is looked at from a physical point of view, the objective machine is expressed as a combination of a plurality of elements on a substance level, and behaviors and attributes of the respective elements as well as the combinational relationship among the respective elements are expressed qualitatively using parameters, as shown in Table 1. The expression form as shown in Table 1 shall be referred to as a "substance model".

TABLE 1

"Substance Model"

exposure portion: $X = H_L - D$
X: logarithm of original reflected quantity of light
$H_L$: logarithm of halogen lamp output quantity of light
D: optical density of copy
photosensitive portion: $V_s = V_n - \beta X$
$V_s$: surface potential after exposure
$V_n$: surface potential after principal charge
$\beta$: sensitivity of photosensitive substance
development portion: $D_s = \gamma_0 (V_s - V_b)$
$D_s$: toner density on drum
$\gamma_0$: toner sensitivity TABLE 1-continued "Substance Model"

$V_b$: bias voltage
output portion: $O_s = \zeta \cdot V_t \cdot D_s$
$O_s$: toner density on output paper
$\zeta$: sensitivity of paper
$V_t$: transfer voltage
separation portion: $S_p = (V_t - A_{sp}) \cdot (V_{sp} - A_{sp})$
$S_p$: adsorbing force between drum and paper
$A_{sp}$: amplitude of separating AC voltage Furthermore, the expression of FIG. 10 in which the substance model is abstracted and shown as a combined tree of the respective parameters shall be referred to as a "mathematical model".

The "substance model" and the "mathematical model" are referred to as an "objective model (qualitative model)" collectively. The "objective model" is qualitative data common to image forming apparatuses which is also made use of for fault repair as described later.

The respective contents of the substance model and the mathematical model which serve as qualitative data are stored in the objective model storage portion 14 (see FIG. 7).

Furthermore, in the objective model storage portion 14, reference value data which are measured in plant shipment, for example, are stored with respect to a predetermined parameter out of parameters included in the substance model. This reference value data is characteristic data intrinsic to this image forming apparatus.

Figures 10, 11:
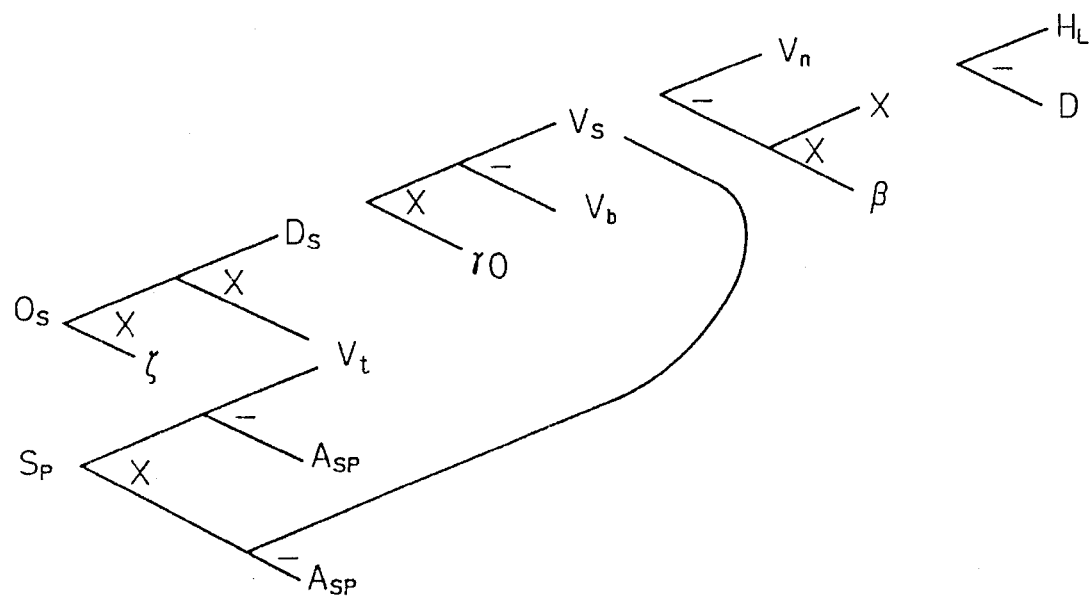
FIG. 10 is a diagram showing a mathematical model of the copying machine according to one embodiment of the present invention.
FIG. 11 is a diagram showing reference value data of respective parameters required when the parameters are symbolized in the copying machine according to one embodiment of the present invention.

For example, in this machine, reference value data specifying the ranges of "low" "normal" and "high" are stored with respect to parameters X, $V_s$, $O_s$ and $V_n$, respectively, as shown in FIG. 11.

Meanwhile, in the present embodiment, the above described reference value data can be renewed in response to sensing data in the process of the later fault diagnosis and fault repair, the change in operating state of the objective machine and the like.

Additionally, function evaluation knowledge used as an example of the fault diagnosis knowledge to be a basis for judging whether or not the objective machine is normally operated is stored in the objective model storage portion 14 on the basis of the symbols obtained by the conversion.

Meanwhile, the function evaluation knowledge, that is, the fault diagnosis knowledge may be one which is intrinsic to the objective machine or may be one which is not intrinsic thereto but is widely common to image forming apparatuses.

The function evaluation knowledge in the present embodiment includes the following knowledge:

picture image density $O_s$=normal fog degree $O_s$'<normal separation performance $S_p$<normal Here, when $O_s$, $O_s$' and $S_p$ do not meet the above described conditions, the objective machine is not operating normally.

Let's consider a case where digitized sensor information of the objective machine in a normal operation takes the following values:

value X of the AE sensor 1a=23 value $V_s$ of the surface potential sensor 1b=380 value $O_s$ of the densitometer 1c=7

Furthermore, it is determined that:

value $O_s$ of the densitometer 1c=fog degree $O_s$' in a case where a blank original at optical density D=0 is used, value $V_s$ of the surface potential sensor 1b=dark potential $V_n$ in a state where the halogen lamp is put off, and it is assumed that the values were:
 fog degree $O_s'=50$
 dark potential $V_n=590$ Meanwhile, measurements of the fog degree $O_s'$ and the dark potential $V_n$ may be made through a manual operation, or may be so programmed as to be made automatically under constant conditions, for example, whenever the power supply of the objective machine is turned on or before copying is started. In the present embodiment, the latter is adopted.

The values X, $V_s$, $O_s$, $O_s'$ and $V_n$ obtained by the AE sensor 1a, the surface potential sensor 1b and the densitometer 1c are respectively converted into symbols in the digital signal-to-symbol conversion portion 11. As described in the foregoing, the conversion is made in such a manner that the digital value given from the sensor 1a, 1b or 1c is compared with the reference value data serving as the characteristic data stored in the objective model storage portion 14, and is converted into any one of three types of symbols "normal", "high" or "low".

In the present embodiment, the respective parameters are symbolized as follows:
 X=normal
 $V_s$=low
 $O_s$=low
 $V_n$=low In the fault diagnosis portion 12, these respective symbolized parameters are compared with the function evaluation knowledge serving as an example of the fault diagnosis knowledge which is stored in the objective model storage portion 14. As a result, since the picture image density $O_s$ is not "normal", it is judged that a fault exists and the fault symptom is "picture image density low ($O_s$=low)". Fault diagnosis, that is, inference of the fault is subsequently made with "$O_s$=low" being the fault symptom.

Fault diagnosis method

First, fault diagnosis is made in the fault simulation portion 13 using the mathematical model shown in FIG. 10, to retrieve parameters which may cause $O_s$=low.

Figure 12:
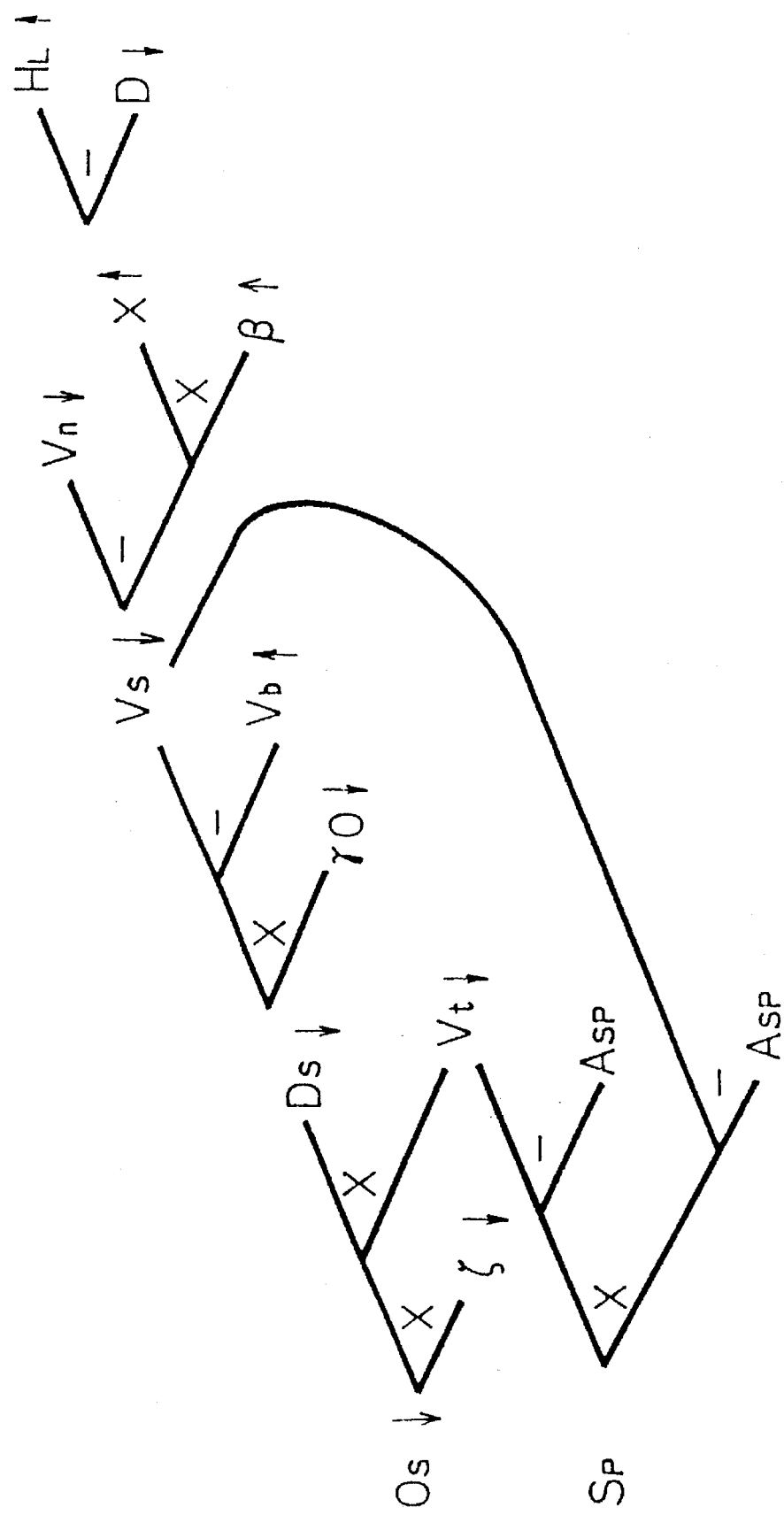
FIG. 12A and FIG. 12B are diagrams showing the development for fault diagnosis on the above described mathematical model.

FIG. 12 is obtained when the parameters which may decrease $O_s$ are pointed out on the mathematical model in FIG. 10. In FIG. 12, parameters marked with upward arrows or downward arrows are parameters which may cause $O_s$=low, the parameters marked with the upward arrows causing $O_s$=low when they are increased and the parameters marked with the downward arrows causing $O_s$=low when they are decreased.

The causes of changing parameters are then detected in the fault diagnosis portion 12 with respect to parameters $\zeta$, $D_s$, $V_t$, $\gamma_O$, $V_b$, $V_s$, $V_n$, X, $\beta$, $H_L$ and D that might cause $O_s$=low which have been retrieved on the mathematical model.

This detection is performed on the basis of the substance model shown in Table 1. In the present embodiment, an inference of the following fault candidates is drawn. That is:

$V_t$=low: →defective transfer transformer
 $\zeta$=low: →deterioration of paper
 $V_b$=high: →improper development bias
 $\gamma_O$=low: →deterioration of toner
 $V_n$=low: →improper principal charge voltage
 $H_L$=high: →improper setting of halogen lamp
 D=low: →lightly printed original The knowledge mentioned on the right side of arrows "→" out of the above described fault candidates, that is, knowledge such as "defective transfer transformer", "deterioration of paper", "improper development bias" or the like is fault knowledge. This knowledge is included in the qualitative data common to the image forming apparatuses. $\beta$ out of the parameters is excluded because it is the sensitivity of the photosensitive member and is not increased. $D_s$, $V_s$ and X are also excluded because they are expressed by other parameters.

Simulation of the fault state is made in the fault simulation portion 13 for the above described inference which has been drawn in the fault diagnosis portion 12. The simulation of the fault state means respectively inferring the states of the objective machine in cases where the above described faults inferred occur. More specifically, it is assumed that the cause of creating $O_s$=low, that is, the fault is, for example, "defective transfer transformer", to set $V_t$=low with respect to the model in a normal state. The effects exerted on respective parameters in such a state are then examined on the mathematical model.

For example, when $V_t$=low is set, $O_s$=low and $S_p$=low are obtained and the other parameters are all "normal", which are contradictory to $V_s$=low and $V_n$=low obtained from the sensors. Therefore, such a conclusion is drawn that the inference of the fault is in error.

Similarly, $\zeta$=low is set on the mathematical model in a normal state and the result obtained by setting $\zeta$ is compared with a symbol which is obtained from the sensor. Also in this case, a contradiction is found because $V_s$=normal and $V_n$=normal are obtained on the mathematical model, while $V_s$=low and $V_n$=low are obtained from the sensors. Accordingly, it is judged that the inference of the fault is in error.

Simulation of the fault states is thus made with respect to all the fault candidates, to confirm whether or not the inference of the fault is right.

As a result, in the present embodiment, such a conclusion is drawn that the result which coincides with the actual state of the objective machine is obtained if the fault is "improper principal charge voltage (Vn=low)" and the other fault candidates are all contradictory to the actual state of the objective machine.

Accordingly, it is possible to conclude that the fault in this case is "improper principal charge voltage". The conditions of the respective parameters of the objective machine at that time are as shown in Table 2.

TABLE 2

| Improper Principal Charge Voltage | | |
|---|---|---|
| $H_L$ = normal | $V_b$ = normal | $A_{sp}$ = normal |
| D = normal | $\gamma 0$ = normal | $S_p$ = low |
| X = normal | $D_s$ = low | |
| $\beta$ = normal | $V_t$ = normal | |
| $V_n$ = low | $\zeta$ = normal | |
| $V_s$ = low | $O_s$ = low | |

Figure 13:
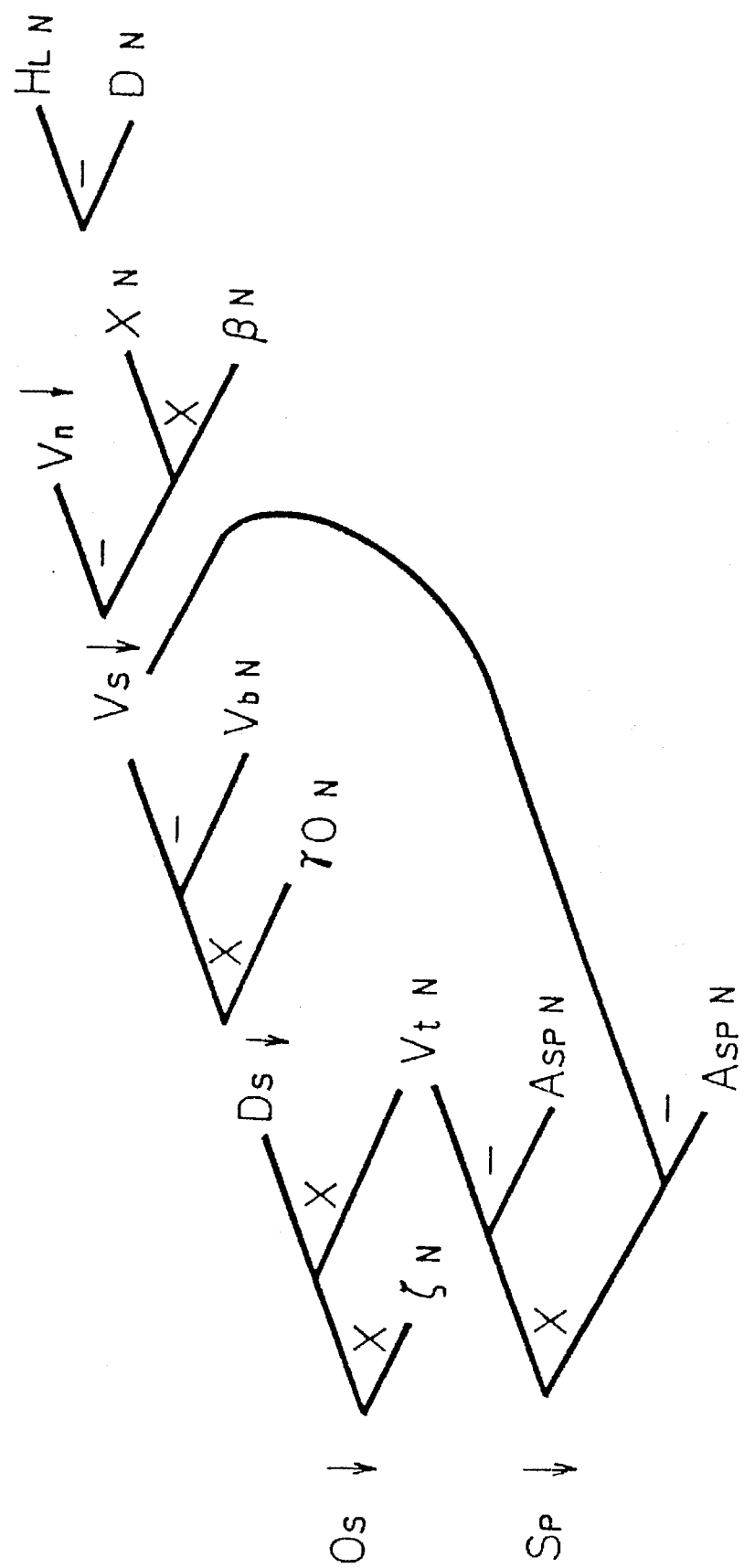
FIG. 13 is a diagram showing the development for fault diagnosis on the above described mathematical model.

FIG. 13 is obtained when the conditions of the parameters shown in Table 2 are traced on the mathematical model. In FIG. 13, a downward arrow, an upward arrow, and N which are marked on the right side of the parameters respectively indicate "low", "high", and "normal".

Execution of repair work

Repair work is then executed on the basis of the results of the fault diagnosis made in the fault diagnosis portion 12 and the fault simulation portion 13.

The repair work will be described in sequence in accordance with the flow charts of FIGS. 14 to 20.

Fault repair processing by retrieval of cases

Prior to repair work, fault diagnosis according to the above described method is made (step S21). It is assumed as a result of the fault diagnosis that a fault symptom which appears is "picture image density low ($O_s$=low)" and a fault causing the fault symptom is "improper principal charge voltage". The conditions of respective parameters at that time are shown in Table 2.

Processing for determining a case to be applied is then performed on the basis of the results of the above described fault diagnosis (step S22). The concrete contents of the processing in the step S22 are shown in a flow chart of FIG. 17.

Figure 17:
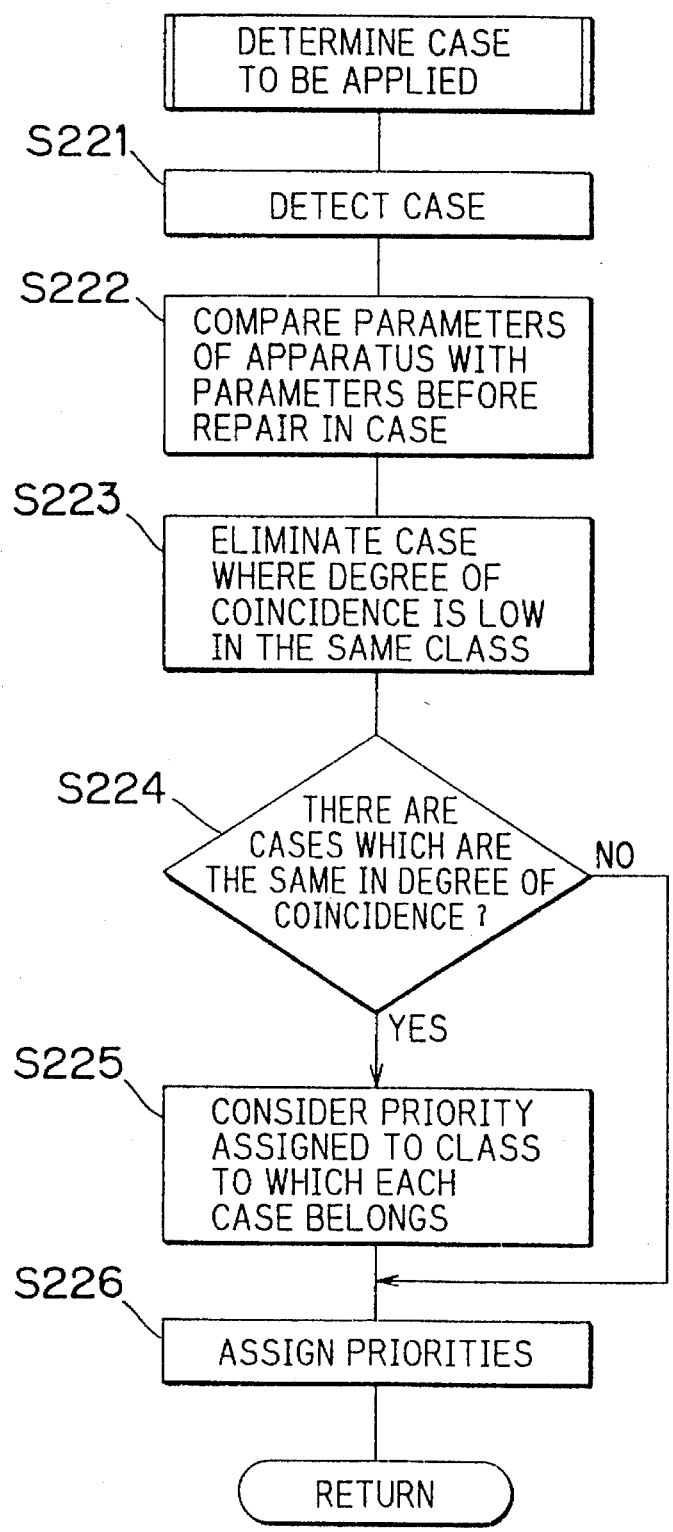
FIG. 17 is a flow chart showing one example of "processing for determining a case" to be applied in one embodiment of the present invention.

Referring to FIG. 17, a case applying to the results of the fault diagnosis is detected out of the cases stored in the case base storage portion 17 (see FIG. 17) (step S221). The cases stored in the case base storage portion 17 are hierarchically classified into classes according to the fault symptom and the fault. One example of the cases stored is shown in Table 3.

TABLE 3

| symptom | fault | class | case number | priority | characteristics |
|---|---|---|---|---|---|
| picture image density low | improper principal charge voltage | C1 | 001, 002 | 3 | $V_n$ = ab, $V_s$ = ab, $D_s$ = ab, $O_s$ = ab, $S_p$ = ab |
| | | C2 | 004 | 2 | — |
| | | C3 | 003 | 1 | — |
| | improper setting of halogen lamp | C4 | 005 | 1 | — |
| picture image fog | improper principal charge voltage | C5 | 006, 008, 009 | 2 | $V_n$ = ab, $V_s$ = ab, $D_s$ = ab, $O_s$ = ab |
| | | C6 | 007 | 1 | — |
| | improper setting of halogen lamp | C7 | 010 | 1 | — |

As shown in Table 3, either one of a fault "improper principal charge voltage" or a fault "improper setting of halogen lamp" is considered for a fault symptom "picture image density low".

When the fault is "improper principal charge volt age", four cases 001, 002, 004, and 003 classified into classes C1, C2 and C3 are registered. In addition, priorities are assigned to the three classes C1, C2 and C3. In this example, priorities are assigned in the order of C3, C2 and C1. Further, the class C1 to which a plurality of cases belong stores characteristics. The characteristics of this class C1 are characteristics common to the plurality of cases belonging to the class C1. The contents thereof will be described in detail later.

When the fault is "improper setting of halogen lamp", only one case 005 belonging to one class C4 is registered. A class to which only one case belongs has no characteristics because it cannot extract characteristics.

Similarly, when the fault symptom is "picture image fog", two faults "improper principal charge voltage" and "improper setting of halogen lamp" are considered. When the fault is "improper principal charge voltage", cases can be classified into two classes C5 and C6. Three cases 006, 008 and 009 belong to the class C5. A case 007 belongs to the class C6. The higher priority is assigned to the class $C_6$ out of the classes $C_5$ and $C_6$. In addition, characteristics common to the three cases belonging to the class $C_5$ are extracted and stored.

On the other hand, when the fault is "improper setting of halogen lamp", only one case 010 belonging to a class C7 is registered.

Meanwhile, in the above described step S221, the cases 001, 002, 004 and 003 belonging to the fault symptom "picture image density low" and the fault "improper principal charge voltage" obtained by the fault diagnosis are detected out of the cases hierarchically classified shown in Table 3.

The contents of the four cases detected are shown in Table 4, Table 5, Table 6 and Table 7. As shown in Table 4 to Table 7, each of the cases stores the case number, the condition of parameters before repair, the condition of parameters after repair, the fault symptom, the fault, the number of repair work, the number of times of success in application, and the number of times of failure in application.

TABLE 4 case 001

| condition before repair | $H_L$ = normal<br>$\beta$ = normal<br>$V_b$ = normal<br>$D_s$ = low<br>$\zeta$ = normal<br>$A_{sp}$ = normal | D = normal<br>$V_n$ = low<br>$\gamma_0$ = normal<br>$V_t$ = normal<br>$O_s$ = low<br>$S_p$ = low | X = normal<br>$V_s$ = low |
|---|---|---|---|
| condition after repair | $H_L$ = normal<br>X = normal<br>$V_n$ = normal<br>$V_b$ = normal<br>$D_s$ = normal<br>$\zeta$ = normal<br>$A_{sp}$ = normal | D = normal<br>$\beta$ = normal<br>$V_s$ = normal<br>$\gamma_0$ = normal<br>$V_t$ = normal<br>$O_s$ = normal<br>$S_p$ = normal | |
| fault symptom | picture image density low | | |
| fault | improper principal charge voltage | | |
| repair work | 2 | | |
| number of times of success in application | 3 | number of times of failure in application | 1 |

TABLE 5 case 002

| condition before repair | $H_L$ = normal<br>$\beta$ = low<br>$V_b$ = normal<br>$D_s$ = low<br>$\zeta$ = normal<br>$A_{sp}$ = normal | D = normal<br>$V_n$ = low<br>$\gamma_0$ = normal<br>$V_t$ = normal<br>$O_s$ = low<br>$S_p$ = low | X = normal<br>$V_s$ = low |
|---|---|---|---|
| condition after repair | $H_L$ = normal<br>X = normal<br>$V_n$ = normal<br>$V_b$ = normal<br>$D_s$ = normal<br>$\zeta$ = normal<br>$A_{sp}$ = normal | D = normal<br>$\beta$ = normal<br>$V_s$ = normal<br>$\gamma_0$ = normal<br>$V_t$ = normal<br>$O_s$ = normal<br>$S_p$ = normal | |
| fault symptom | picture image density low | | |
| fault | improper principal charge voltage | | |
| repair work | 3, 2 | | |
| number of times of success in application | 1 | number of times of failure in application | 0 |

TABLE 6 case 003

| condition before repair | $H_L$ = high<br>$\beta$ = high<br>$V_b$ = normal<br>$D_s$ = low<br>$\zeta$ = normal<br>$A_{sp}$ = normal | D = normal<br>$V_n$ = low<br>$\gamma_0$ = normal<br>$V_t$ = normal<br>$O_s$ = low<br>$S_p$ = normal | X = high<br>$V_s$ = low |
|---|---|---|---|
| condition after repair | $H_L$ = normal<br>X = normal<br>$V_n$ = normal<br>$V_b$ = normal<br>$D_s$ = normal<br>$\zeta$ = normal | D = normal<br>$\beta$ = normal<br>$V_s$ = normal<br>$\gamma_0$ = normal<br>$V_t$ = normal<br>$O_s$ = normal | |

TABLE 6-continued case 003

| | | | |
|---|---|---|---|
| fault symptom | $A_{sp}$ = normal<br>picture image density low | $S_p$ = normal | |
| fault | improper principal charge voltage | | |
| repair work | 2 | | |
| number of times of success in application | 3 | number of times of failure in application | 1 |

TABLE 7 case 004

| | | | |
|---|---|---|---|
| condition before repair | $H_L$ = high<br>$\beta$ = normal<br>$V_b$ = normal<br>$D_s$ = low<br>$\zeta$ = normal<br>$A_{sp}$ = normal | D = normal<br>$V_n$ = normal<br>$\gamma_0$ = normal<br>$V_t$ = normal<br>$O_s$ = low<br>$S_p$ = normal | X = high<br>$V_{s=}$ low |
| condition after repair | $H_L$ = normal<br>X = normal<br>$V_n$ = normal<br>$V_b$ = normal<br>$D_s$ = normal<br>$\zeta$ = normal<br>$A_{sp}$ = normal | D = normal<br>$\beta$ = normal<br>$V_s$ = normal<br>$\gamma_0$ = normal<br>$V_t$ = normal<br>$O_s$ = normal<br>$S_p$ = normal | |
| fault symptom | picture image density low | | |
| fault | improper principal charge voltage | | |
| repair work | 2 | | |
| number of times of success in application | 1 | number of times of failure in application | 0 |

The conditions of the parameters shown in Table 2 indicating the present state of the apparatus are compared with the condition of parameters stored in the item of "condition before repair" in each of Table 4 to Table 7 (step S222). As a result of the comparison, the conditions of all the parameters and the conditions of the parameters shown in Table 2 coincide with each other in the case 001. In the case 002, they differ in $\beta$. In the case 003, they differ in $H_L$, X, $\beta$ and $S_p$. In the case 004, they differ in $H_L$, X, $V_n$ and $S_p$.

Consequently, it is determined that the order of priority concerning the application of cases is (1) 001, (2) 002, and (3) 003 or 004.

A case where the degree of coincidence of the conditions of parameters is low in the same class is then eliminated (step S223). In this case, both the cases 001 and 002 belong to the class C1, and the degree of coincidence of the condition of parameters in the case 002 is lower than that in the case 001. Accordingly, the case 002 is eliminated with regard to the order of priority concerning the application of cases. As a result, the order of priority concerning the application is (1) 001, and (2) 003 or 004.

It is then judged whether or not there are cases which are the same in the degree of coincidence of the conditions of parameters (step S224). In the above described situation, the case 003 and the case 004 are the same in the degree of coincidence of the conditions of parameters. Therefore, priorities assigned to the classes C3 and C2 to which the cases 003 and 004 respectively belong (see Table 3) are considered in judging which of the cases 003 and 004 is first applied (step S225). In this case, the priority assigned to the class C2 is "2", and the priority assigned to the class C3 is "1". Accordingly, the case 003 is applied in preference to the case 004.

When there are no cases which are the same in the degree of coincidence of the conditions of parameters, the processing in the step S225 is omitted.

Finally, the order of priority concerning application of cases is (1) 001, (2) 003, and (3) 004 (step S226). Processing for determining a case to be applied is returned.

A case to be applied may be determined using processing according to the flow chart of FIG. 18 in place of the above described processing for determining a case to be applied as described with reference to FIG. 17. In the flow chart of FIG. 18, the contents of the processing in steps given the same numbers as those shown in the flow chart of FIG. 17, that is, steps S221 to S224, S225 and S226 are exactly the same as those described with reference to FIG. 17.

Figure 18:
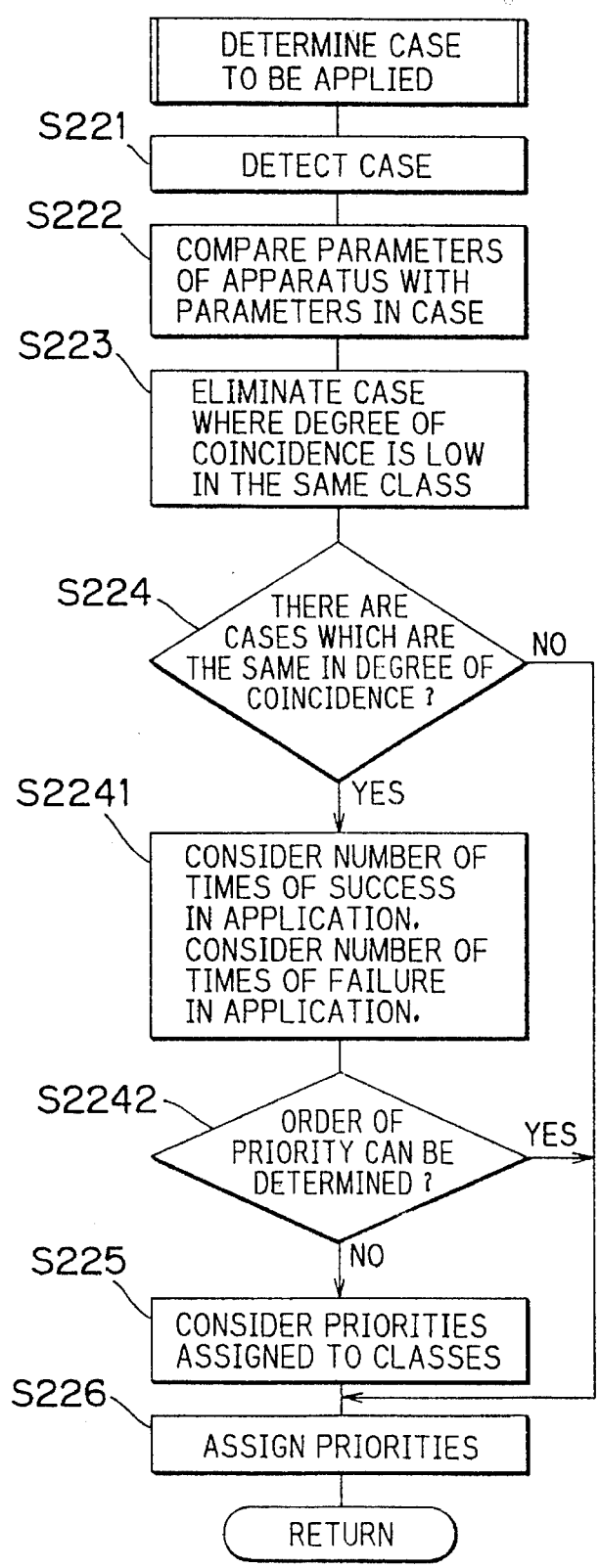
FIG. 18 is a flow chart showing another example of "processing for determining a case" to be applied in one embodiment of the present invention.

The processing shown in the flow chart of FIG. 18 is characterized in that processing in step S2241 and processing in step S2242 are inserted in step S224 as a method of determining the order of priority in a situation where there are a plurality of cases which are the same in the degree of coincidence of the conditions of parameters before repair and the present conditions of the parameters of the apparatus (see Table 2).

Specifically, when there are a plurality of cases which are the same in the degree of coincidence of the conditions of parameters (YES in the step S224), the number of times of success in application and/or the number of times of failure in application registered in each of the cases are considered (step S2241). In the above described concrete example, the cases 003 and 004 are the same in the degree of coincidence of the conditions of parameters. Therefore, the numbers of times of success in application in both the cases 003 and 004 are first checked. The number of times of success in application is "3", as shown in Table 6, in the case 003, while being "1", as shown in Table 7, in the case 004. Therefore, the higher priority is assigned to the case 003 where the number of times of success in application is large. If the numbers of times of success in application are equal, the higher priority is assigned to a case where the number of times of failure in application is small.

If the order of priority concerning application of a plurality of cases can be determined as a result of considering the number of times of success in application or considering the number of times of success in application and the number of times of failure in application (YES in step S2242), priorities concerning application are assigned to all the cases detected (step S226).

If the number of times of success in application and the number of times of failure in application in the cases which are considered in the step S2241 are respectively equal to each other so that the order of priority cannot be determined (NO in step S2242), priorities assigned to classes to which the cases belong are considered to determine the order of priority (steps S225 and S226).

The larger the number of times of past repair work is, the more effective a method of determining the order of priority concerning the application on the basis of the consideration of the number of times of success in application in the cases or the consideration of the number of times of success in application and the number of times of failure in application in the cases is. The reason for this is that when repair work has been performed many times in the past, the results of the past repair work are considered in the method.

Figure 14:
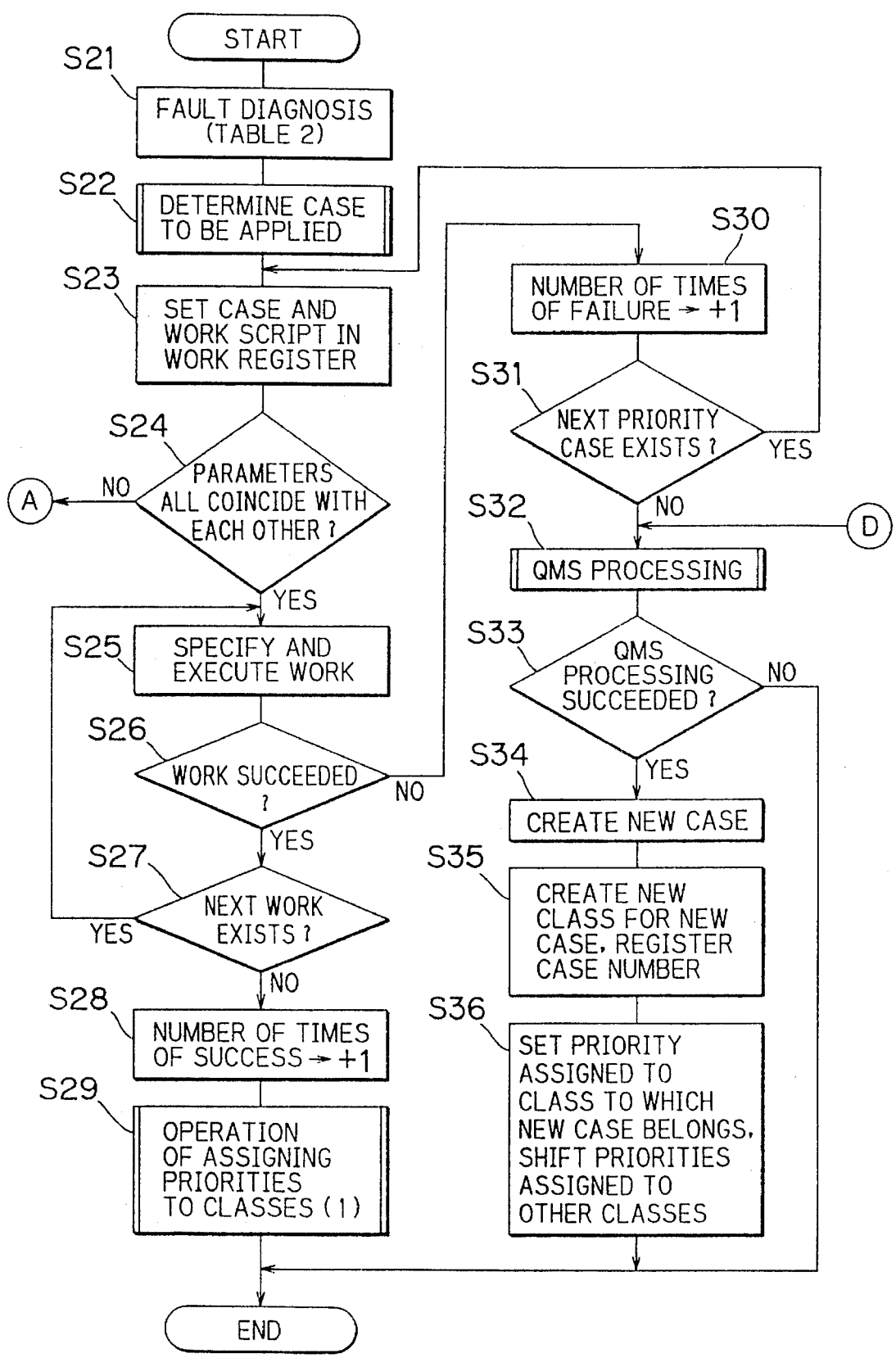
FIG. 14 is a flow chart showing a part of processing for repair work to which cases are applied in one embodiment of the present invention.

Turning to FIG. 14, the description of this example will be continued.

A case to be applied is determined (step S22) and then, the case being determined, the case 001 and a work script corresponding to this case 001 are read out from the work script storage portion 18 (see FIG. 17) and are set in a work register (step S23).

As described above, the cases are classified into classes, and the cases belonging to the same class share the same work script. The case 001 belongs to the class C1, and a work script shown in the following table 8 corresponds to the class C1.

TABLE 8

| | work script | | class: C1 |
|---|---|---|---|
| No | condition of antecedent | operation of antecedent | condition of consequent |
| 1 | $H_L$ = high | AVR -- down | $H_L$ = normal |
| 2 | $V_n$ = low | VR1 -- up | $V_n$ = normal |
| 3 | $V_t$ = low | VR2 -- up | $V_t$ = normal |
| 4 | $H_L$ = normal | VR1 -- down | $V_t$ = low |
| 5 | $V_n$ = normal | VR1 -- down | $V_n$ = low |
| . | . | . | . |
| . | . | . | . |
| . | . | . | . |

As shown in Table 8, in the work script, the class C1 to be an index is mentioned, and a plurality of types of work 1, 2, 3, . . . are listed. Each work is mentioned in the rule form, which comprises the condition of an antecedent, the operation of the antecedent and the condition of a consequent. Each work means that the condition of a consequent is obtained if the operation of an antecedent is performed under the condition of the antecedent.

Description is made of a concrete example with reference to Table 8. In the case of, for example, the work 1, the condition of the antecedent is the condition of a parameter $H_L$=high. In this condition, the operation of the antecedent of lowering the lamp volume AVR is performed, thereby to obtain the change of the parameter as the parameter $H_L$=normal, that is, the condition of the consequent.

Meanwhile, a work script is set for each class and work serving as the minimum unit is listed in the work script. Accordingly, work scripts which are equal in number to classes exist.

Referring to FIG. 14, when the case 001 and the work script shown in Table 8 are set in the work register (step S23), the repair plan portion 15 (see FIG. 7) then compares the conditions of the parameters before repair in the case 001 set in the work register (see Table 4) with the conditions of the parameters indicating the present state of the apparatus (see Table 2) to confirm whether or not both completely coincide with each other (step S24).

Since the conditions of the parameters before repair in the case 001 completely coincide with the conditions of the parameters of the apparatus, the processing proceeds to the step S25. In the step S25, work given the number "2" mentioned in the item of "repair work" in the case 001 shown in Table 4 is selected from the work script shown in Table 8 and is performed. That is, the operation of the antecedent of increasing the principal charge volume VR1 is performed in the condition of the antecedent, that is, a parameter $V_n$=low (step S25).

As a result of the operation, it is judged whether or not the work succeeded depending on whether or not the condition of the consequent mentioned in the work script, that is, the condition of the parameter $V_n$=normal is obtained (step S26).

When it is judged that the work succeeded (YES in the step S26), it is further judged whether or not the next work exists (step S27). Since only the above described number of work "2" is mentioned in the item of "repair work" in the case 001 shown in Table 4, it is judged that the next work does not exist. If the number of the next work is mentioned in the item of "repair work" in the case, the processing is returned to the step S25. In the step S25, work given the number is selected from the work script and is performed. Processing for judging whether or not the work succeeded is repeated (steps S25 and S26).

If it is judged in the step S27 that the next work does not exist, the numerical value in the item of "number of times of success in application" in the case 001 is increased by one, so that the number of times of success in application is renewed and registered (step S28).

Thereafter, an operation of assigning priorities to classes (1) is performed (step S29). The procedure for the operation of assigning priorities to classes performed in the step S29 is shown in a flow chart of FIG. 19.

Figure 19:
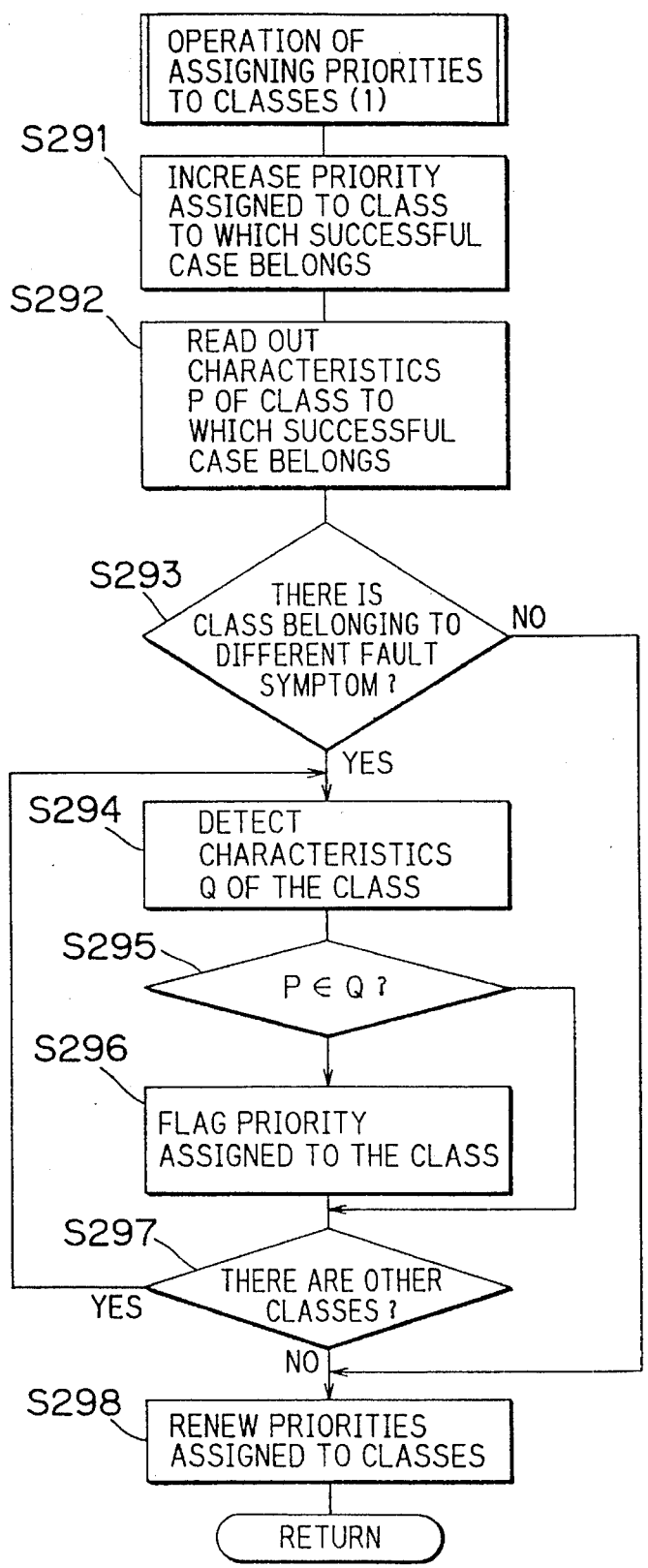
FIG. 19 is a flow chart showing processing for "an operation of assigning priorities to classes (1)" in one embodiment of the present invention.

Referring now to FIG. 19, the procedure for the operation of assigning priorities to classes (1) will be described specifically.

As a result of performing repair work by applying the case 001 with respect to an apparatus in which the fault symptom is "picture image density low" and the fault is "improper principal charge voltage" by the foregoing processing, the repair work succeeded. Therefore, the priority assigned to the class to which the successful case 001 belongs is increased (step S291). Cases are registered for each class, as shown in Table 3 already described, and priorities are set for each class. In this concrete example, the priority assigned to the class C1 to which the case 001 belongs is "3", as shown in Table 3. Since the repair work based on the case 001 succeeded this time, however, the priority assigned to the class C1 to which the case 001 belongs is increased from "3" to "1", as shown in Table 9. That is, the highest priority is assigned to the class C1 and correspondingly, priorities assigned to the other classes C2 and C3 belonging to the fault symptom "picture image density low" and the fault "improper principal charge voltage" are operated. Specifically, the priority assigned to the class C3 is shifted by one from "1" to "2", and the priority assigned to the class C2 is shifted by one from "2" to "3". Accordingly, the order of priorities among the three classes C1, C2 and C3 belonging to the fault symptom and the fault is changed to the order of C1, C2 and C3.

TABLE 9

| symptom | fault | class | case number | priority | characteristics |
|---|---|---|---|---|---|
| picture image density low | improper principal charge voltage | C1 | 001, 002 | 3 → 1 | $V_n$ = ab, $V_s$ = ab, $D_s$ = ab, $O_s$ = ab, $S_p$ = ab |
| | | C2 | 004 | 2 → 3 | — |
| | | C3 | 003 | 1 → 2 | — |
| | improper setting of halogen lamp | C4 | 005 | 1 | — |
| picture image fog | improper principal charge voltage | C5 | 006, 008, 009 | 2 | $V_n$ = ab, $V_s$ = ab, $D_s$ = ab, $O_s$ = ab |
| | | C6 | 007 | 1 | — |
| | improper setting of halogen lamp | C7 | 010 | 1 | — |

Characteristics P of the class C1 to which the successful case 001 belongs are then read out (step S292).

The characteristics P of this class C1 mean the following contents. More specifically, parameters which are common in terms of, for example, "not normal" out of parameters indicating the respective conditions before repair in a plurality of cases 001 and 002 belonging to the class C1 are extracted as characteristics of the class C1.

The contents of the two cases 001 and 002 belonging to the class C1 are respectively as shown in Table 4 and Table 5. Parameters which are not normal out of the parameters listed in the item of "condition before repair" in the case 001 shown in Table 4 are $V_n$, $V_s$, $D_s$, $O_s$ and $S_p$. On the other hand, parameters which are not normal out of the parameters listed in the item of "condition before repair" in the case 002 shown in Table 5 are β, $V_n$, $V_s$, $D_s$, $O_s$ and $S_p$. Accordingly, parameters which are not normal and are common to both the two cases 001 and 002 are $V_n$, $V_s$, $D_s$, $O_s$ and $S_p$. The parameters are extracted and stored as the characteristics P of the class C1. In this case, a parameter is extracted provided that it is not normal. That is, when a certain parameter is high in the case 001, while being low in the case 002, the parameter is extracted as a parameter constituting the characteristics.

Alternatively, parameters which are common in terms of "normal" out of the parameters indicating the respective conditions before repair in cases belonging to a class may be extracted as characteristics of the class.

The characteristics of the class can be extracted only when a plurality of cases belong to the class, and the characteristics cannot be extracted when only one case belongs to the class.

In step S292, the characteristics P of the case C1, that is, such contents that the parameters $V_n$, $V_s$, $D_s$, $O_s$ and $S_p$ are not normal in the conditions before repair are read out and stored in the work register.

It is then judged whether or not there is a class belonging to a fault symptom different from the fault symptom to which the class C1 belongs (step S293). In this concrete example, classes C5, C6 and C7 exist as classes belonging to a fault symptom "picture image fog" different from the fault symptom "picture image density low" to which the class C1 belongs.

When there is a class belonging to a fault symptom different from the fault symptom to which the class C1 belongs (YES in the step S293), characteristics Q of the class are extracted (step S294). Specifically, the characteristics Q of the class C5 are first detected from Table 9 (this table 9 is stored in the case base storage portion 17). The characteristics Q of the class C5 are such contents that parameters $V_n$, $V_s$, $D_s$ and $O_s$ are not normal.

The characteristics P of the class C1 stored in the work register in step S292 are then compared with the characteristics Q of the class C5 detected in the step S294, to judge whether or not the characteristics P are similar to the characteristics Q (step S295). The similarity of the characteristics P to the characteristics Q means that all parameters constituting the characteristics Q contain all the parameters constituting the characteristics P. In this concrete example, the parameters constituting the characteristics P contain a parameter $S_p$, and the parameters constituting the characteristics Q do not contain the parameter $S_p$. Accordingly, the characteristics P are not similar to the characteristics Q. In this concrete example, therefore, the answer to the processing in step S295 is in the negative.

If the characteristics P are similar to the characteristics Q in step S295 (for example, the parameters constituting the characteristics P are $V_n$, $V_s$ and $D_s$, and the parameters constituting the characteristics Q are $V_n$, $V_s$ and $D_s$ or contain other parameters in addition thereto), the processing proceeds to step S296.

In step S296, the priority assigned to the class C5 is flagged. This flag is set so as to indicate, when the priority assigned to a class is renewed in step S298 as described later, that the priority assigned to the class should be renewed.

It is then judged whether or not there are other classes to be processed (step S297). The classes to be processed include the classes C6 and C7 in addition to the class C5. Accordingly, the processing in step S294 and the subsequent steps is performed sequentially for the classes C6 and C7.

Meanwhile, in this concrete example, only a single case belongs to each of the classes C6 and C7. Accordingly, characteristics of the classes C6 and C7 cannot be extracted, so that priorities assigned to the classes C6 and C7 are not flagged.

When there is no class to be processed in step S297, the processing proceeds to step S298. In step S298, priorities assigned to classes included in the fault symptom and the fault to which the class assigned the flagged priority belongs are so renewed that the flagged priority assigned is increased. In this concrete example, the priority assigned to the class C5 is not flagged (because NO in step S295). Accordingly, the priorities assigned to the classes C5 and C6 are equal to each other, as shown in Table 9. If the priority assigned to the class C5 is flagged in step S296, however, the priority assigned to the class C5 is set to "1" in step S298 and correspondingly, the priority assigned to the remaining class C6 is decreased from "1" to "2".

Turning to step S26 shown in FIG. 14, when work is performed but the condition of a consequent mentioned in the work is not obtained, it is judged that the work failed (NO in step S26), so that the number of times of failure in application is so renewed that the numerical value in the item of "number of times of failure in application" in the case (see, for example, Table 4) is increased by one (step S30).

It is judged whether or not a case assigned the next priority exists (step S31). If a case assigned the next priority exists (YES in step S31), the processing in step S23 and the subsequent steps is performed for the case.

When no case assigned the next priority for application exists in step S31, QMS processing is performed (step S32). This QMS processing is preferably processing performed in consideration of secondary effects as described in detail later.

It is judged whether or not the QMS processing succeeded (step S33). If it is judged that the QMS processing succeeded (YES in step S33), a new case is created on the basis of data obtained by the QMS processing (step S34). A new class is created for the new case created, and the case is assigned a case number and registered (step S35).

Table 10 shows an example in which a new case is registered. In Table 10, a new case 030 is registered as one belonging to a new class C10 different from the classes C1, C2 and C3.

TABLE 10

| symptom | fault | class | case number | priority | characteristics |
|---|---|---|---|---|---|
| picture image density low | improper principal charge voltage | C1 | 001, 002 | 1 → 2 | $V_n$ = ab, $V_s$ = ab, $D_s$ = ab, $O_s$ = ab, $S_p$ = ab |
| | | C2 | 004 | 3 → 4 | — |
| | | C3 | 003 | 2 → 3 | — |
| | | C10 | 030 | 1 | — |
| | improper setting of halogen lamp | C4 | 005 | 1 | — |
| picture image fog | improper principal charge voltage | C5 | 006, 008, 009 | 2 | $V_n$ = ab, $V_s$ = ab, $D_s$ = ab, $O_s$ = ab |
| | | C6 | 007 | 1 | — |
| | improper setting of | C7 | 010 | 1 | — |

TABLE 10-continued

| symptom | fault | class | case number | priority | characteristics |
|---|---|---|---|---|---|
| | halogen lamp | | | | |

The priority assigned to the class C10 to which the new case 030 belongs is "1", so that the highest priority is assigned to the case 030.

Correspondingly, priorities assigned to the other classes belonging to the fault symptom "picture image density low" and the fault "improper principal charge voltage" are sequentially shifted. That is, as shown in Table 10, the priority assigned to the class C1 is shifted from 1 to 2, the priority assigned to the class C2 is shifted from 3 to 4, and the priority assigned to the class C3 is shifted from 2 to 3 (step S36).

In step S33, when the QMS processing does not succeed, a new case is not created, so that the processing is terminated.

Figure 15:
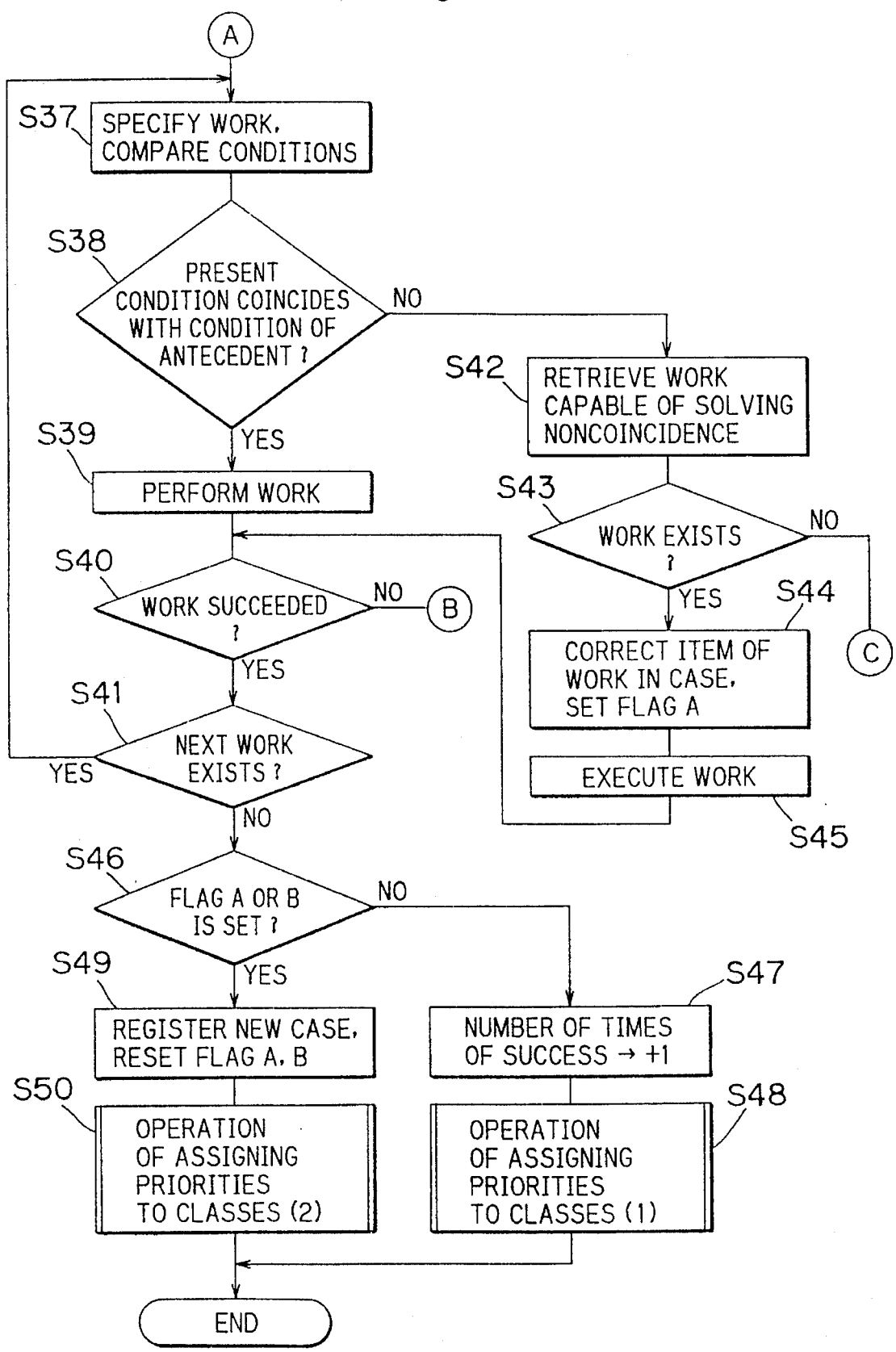
FIG. 15 is a flow chart showing a part of processing for repair work to which cases are applied in one embodiment of the present invention.

When the conditions of parameters before repair in a case to be applied do not completely coincide with the conditions of the parameters of the faulty apparatus in step S24 shown in FIG. 14, the processing proceeds to step S37 shown in FIG. 15.

Referring to FIG. 15, if it is assumed that a case to be applied is, for example, the case 001, work given the number "2" mentioned in the item of "repair work" in the case 001 shown in Table 4 is extracted from the work script corresponding to the class C1 shown in Table 8 and specified, in the step S37. The condition of the antecedent in the work 2, that is, the parameter $V_n$=low is compared with the condition of the parameter $V_n$ of the faulty apparatus shown in Table 2, to judge whether or not both the conditions of the parameters coincide with each other (step S38).

In this concrete example, the condition of the parameter of the faulty apparatus coincides with the condition of the antecedent in the work 2 specified, so that the work 2 is performed (step S39). After the work is performed in step S39, it is judged whether or not the work succeeded (step S40). If the work succeeded, it is judged whether or not the next work exists (step S41).

In the step S38, if the parameter $V_n$ of the faulty apparatus is normal, the condition of the parameter $V_n$ does not coincide with the condition of the antecedent in the work 2, that is, the parameter $V_n$=low. In such a situation, additional processing 1 described in the steps S42 to S45 is so performed that the condition of the parameter of the apparatus coincides with the condition of the antecedent in the work.

More specifically, the processing proceeds to step S42. In step S42, it is judged whether or not another work capable of causing the condition of the parameter of the faulty apparatus to coincide with the condition of the antecedent in the work 2 exists in the work script shown in Table 8. That is, in this concrete example, it is judged whether or not there is work capable of changing the parameter $V_n$ of the faulty apparatus from "normal" to "low".

As can be seen from Table 8, the parameter $V_n$ can be changed from "normal" to "low" by work 5. Accordingly, the inquiry is answered in the affirmative in step S43, so that the item of "repair work" in the case 001 shown in Table 4 is temporarily corrected from "2" to "5, 2", and a flag A is set so as to indicate that the temporary correction is made (step S44).

The work 5 added by the temporary correction is then executed (step S45), and it is judged whether or not the work 5 succeeded (step S40). When this work 5 succeeds (YES in the step S40), it is judged whether or not the next work exists (step S41). In this case, the work 2 exists as the next work, and the processing proceeds to step S37 again. In step S37, the next work 2 is specified, and the condition of the antecedent in the work 2 is compared with the condition of the parameter of the faulty apparatus. As a result, the condition of the parameter of the faulty apparatus is $V_n$=low by the execution of the work 5 in step S45, which coincides with the condition of the antecedent in the work 2. Accordingly, it is judged in step S38 that the inquiry is answered in the affirmative, so that the work 2 is executed (step S39).

Meanwhile, when the operation of an antecedent in a work is performed but the condition of a consequent in the work is not obtained in step S39 or S45, it is judged that the work failed (step S40). In other words, when the condition of a parameter obtained as a result of performing certain work (the condition of a parameter of the faulty apparatus after the work) is not the condition of the parameter set in the work (the condition of a consequent), it is judged that the work failed.

Figure 16:
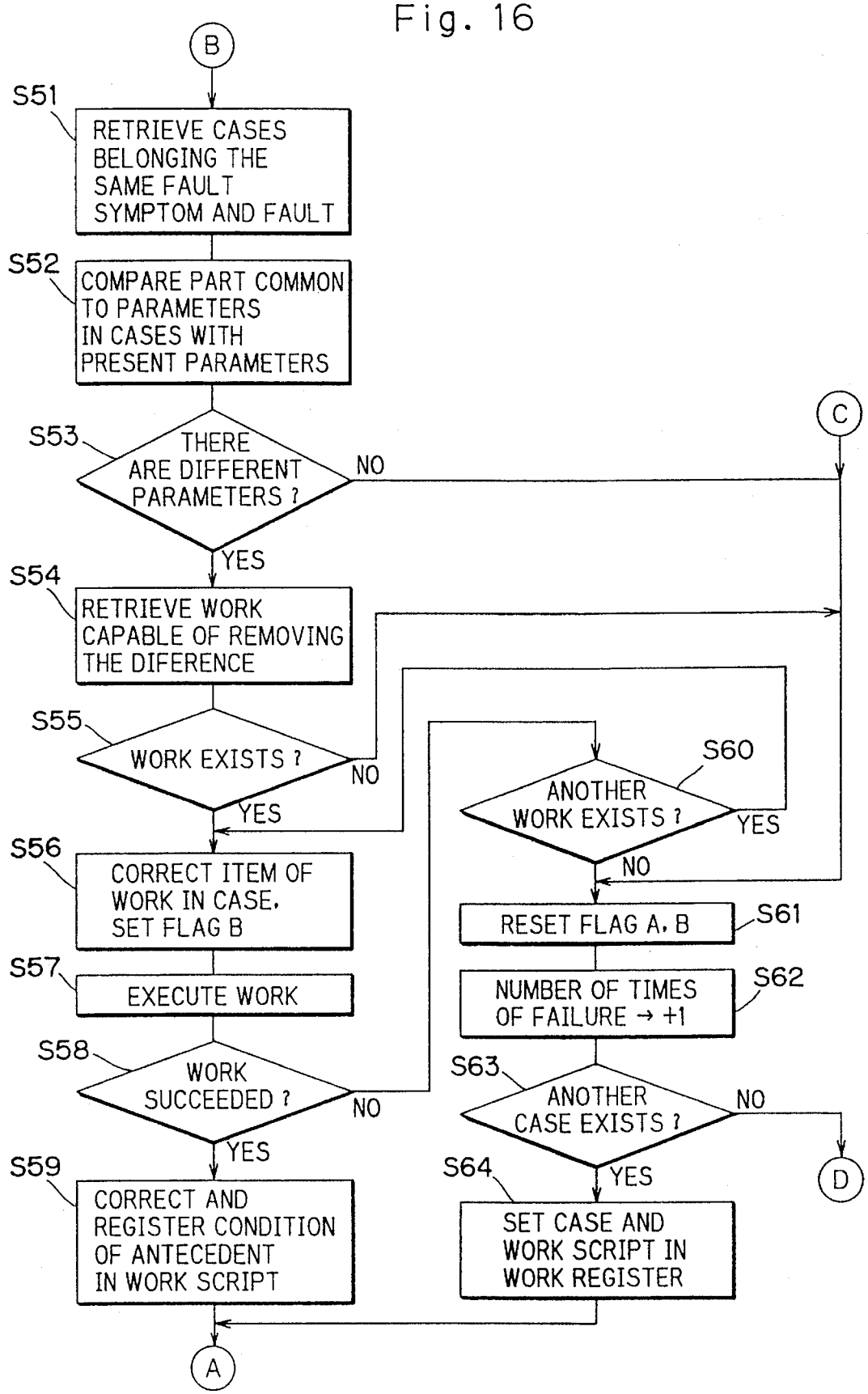
FIG. 16 is a flow chart showing a part of processing for repair work to which cases are applied in one embodiment of the present invention.

At this time, additional processing 2 for avoiding the cause of the failure in the work as described along the following flow of FIG. 16 is performed.

More specifically, all cases belonging to the same fault symptom and fault as the fault symptom and the fault to which a case which is unsuccessfully applied belongs are retrieved, and all cases in which the number of work which failed is mentioned in the item of "repair work" out of the cases are detected (step S51).

For easy illustration along the concrete example, it is assumed that the case which is unsuccessfully applied is a case 001. In this case, cases belonging to the same fault symptom and fault as the fault symptom and the fault to which the case 001 belongs are cases 002, 003 and 004, as shown in Table 3. In any one of the cases, the number of work 2 which is the same as the number of work 2 which failed in the case 001 is mentioned in the item of "repair work" (see Table 4, Table 5, Table 6 and Table 7). Accordingly, the cases 002 to 004 are detected (step S51).

The conditions of parameters before repair in the case 001 which is unsuccessfully applied and the cases 002, 003 and 004 detected are compared with each other to extract a part common to the conditions of the parameters, and the common part extracted is compared with the conditions of the parameters of the faulty apparatus shown in Table 2 (step S52). As a result, it is judged whether or not there is a difference between the part common to the respective conditions of the parameters before repair in the cases and the conditions of the parameters of the faulty apparatus (step S53).

Even if the conditions of the parameters before repair in the cases 001 to 004 shown in Table 4 to Table 7 are compared with the conditions of the parameters of the faulty apparatus shown in Table 2, such a difference is not found in the concrete example. Therefore, description is now made assuming that a parameter $V_t$=low is common to the conditions of the parameters before repair in the cases 001 to 004. In step S53, the parameter $V_t$ is taken up as a difference between the part common to the conditions of the parameters before repair in the cases 001 to 004 and the conditions of the parameters of the faulty apparatus. That is, the parameter $V_t$=low in the conditions of the parameters before repair in the cases 001 to 004, while the parameter $V_t$=normal in the conditions of the parameters of the faulty apparatus.

Therefore, it is judged in step S53 that the inquiry is answered in the affirmative, so that it is hypothesized that the parameter $V_f$=low is the cause of the failure in the work performed this time, work capable of changing this parameter $V_t$ from "low" to "normal" is retrieved from the work script shown in Table 8 (step S54), and it is judged whether or not the work exists (step S55).

The work script shown in Table 8 indicates that the parameter $V_t$ can be changed from "low" to "normal" by the work 3. Accordingly, it is judged that the work exists (YES in step S55).

In this case, the item of "repair work" in the case 001 which is unsuccessfully applied (see Table 4) is temporarily corrected, and the number of work "3" is inserted ahead of the number of work "2". In addition, a flag B is set so as to indicate that this temporary correction is made (step S56). The work 3 is then executed (step S57). When the parameter $V_f$=normal is obtained as a result of the execution of the work 3, it is judged that the work succeeded (YES in step S58).

In this case, the parameter $V_f$=normal is the condition indispensable for the condition of the antecedent in the work 2. Accordingly, such a correction is made that $V_f$=normal is added to the condition of the antecedent in the work 2 in the work script shown in Table 8, and the work script shown in Table 8 is reloaded with that shown in the following table 11 (step S59).

TABLE 11

| work script | | class: C1 | |
|---|---|---|---|
| No | condition of antecedent | operation of antecedent | condition of consequent |
| 1 | $H_L$ = high | AVR -- down | $H_L$ = normal |
| 2 | $V_n$ = low, $V_t$ = normal | VR1 -- up | $V_n$ = normal |
| 3 | $V_t$ = low | VR2 -- up | $V_t$ = normal |
| 4 | $H_L$ = normal | VR1 -- down | $V_t$ = low |
| 5 | $V_n$ = normal | VR1 -- down | $V_n$ = low |
| . | . | . | . |
| . | . | . | . |
| . | . | . | . |

In the work script shown in Table 11, the condition of an antecedent in work 2 is "$V_n$=low (and) $V_f$=normal".

The processing in step S37 and the subsequent steps shown in FIG. 15 is performed again.

If it is judged in step S58 shown in FIG. 16 that the work did not succeed, it is judged whether or not another work capable of changing the parameter $V_t$ from "low" to "normal" exists in the work script shown in Table 8 (step S60). If the work exists, the processing in step S56 and the subsequent steps is repeated.

On the other hand, in any one of the cases where it is judged in step S60 that there is no other work, it is judged in step S53 that there is no parameter which differs in condition, it is judged in step S55 that there is no work, and it is judged in step S43 shown in FIG. 15 that there is no work, the processing proceeds to step S61. In step S61, the flags A and B are reset. Further, in this case, a case is unsuccessfully applied. Accordingly, the numerical value in the item of "number of times of failure in application" in the case is increased by one (step S62). It is judged whether or not another case, that is, a case assigned the next priority for application exists (step S63).

When the case assigned the next priority for application exists (YES in step S63), the case and a corresponding work script are set in the work register (step S64), and the processing in step S37 and the subsequent steps shown in FIG. 15 is performed.

On the other hand, when it is judged in step S63 that the case assigned the next priority for application does not exist, the processing proceeds to the step S32 shown in FIG. 14. In the step S32, QMS processing is performed.

Turning to FIG. 15, description is now made of the processing performed after it is judged in step S41 that the next work does not exist. In this situation, the state of the flag A or B is judged (step S46). A case where it is judged that neither one of the flags A and B is set as a result of the judgment of the state is a case where the condition of a parameter of the faulty apparatus coincides with the condition of an antecedent in the selected work in the processing before the judgment and the work is executed, resulting in success. In this situation, therefore, the numerical value in the item of "number of times of success in application" in a case applied, for example, the case 001 is increased by one in step S47. An operation of assigning priorities to classes (1) is executed (step S48). The operation of assigning priorities to classes (1) in step S48 is exactly the same as the operation executed in step S29 shown in FIG. 14. Therefore, the concrete contents of the operation in step S48 are omitted so as to avoid the overlapped description.

On the other hand, consider a case where it is judged in the step S46 that either one of the flags A and B is set.

A case where the flag A is set is a case where the additional processing 1 in steps S42 to S45 is performed. Specifically, it is a case where work given a number mentioned in the item of "repair work" in the case failed in spite of attempts to select the work from a work script and perform the work because the condition of a parameter of the faulty apparatus does not coincide with the condition of an antecedent in the work, and the work succeeded after performing another work for causing the condition of the parameter of the faulty apparatus to coincide with the above described condition of the antecedent. In other words, it is a case where the case is successfully referred to, as a result of introducing an operation of "detailing of a work script" as described above, by the detailing.

On the other hand, in a case where the flag B is set is a case where the additional processing 2 in steps S51 to S59 is performed. Specifically, it is a case where selected work did not succeed because the condition of an antecedent in the work was not sufficiently specified, and the work succeeds by performing work for specifying the condition of the antecedent in the work as well as changing the condition of a parameter of the faulty apparatus so as to coincide with the condition of the antecedent because the difference between the condition of the parameter of the faulty apparatus and the condition of the antecedent is removed. This case is also a case where the case is successfully referred to, as a result of introducing an operation of "detailing of a work script", by the detailing.

Therefore, a case where the flag A or B is set means that the operation of "detailing of a work script" is introduced so that the original case is corrected and a new case is created within a range in which the cases can be qualitatively reached from each other. It should be considered that the new case created belongs to the same class as the class to which the original case belongs. This is as described in "SUMMARY OF THE INVENTION".

When it is judged in step S46 that the flag A or B is set, the processing proceeds to step S49. In the step S49, a newly created case is registered in the same class as a class to which the original case belongs and then, the flag A and/or the flag B are reset.

Table 12 shows one example of the contents stored in the case base storage portion 17 (see FIG. 7) after this new case is registered. As shown in Table 12, a case 040 is newly registered as a case belonging to the class C1.

TABLE 12

| symptom | fault | class | case number | priority | characteristics |
|---|---|---|---|---|---|
| picture image density low | improper principal charge voltage | C1 | 001, 002 040 | 2 → 1 | $V_n = ab$, $V_s = ab$, $D_s = ab$, $O_s = ab$, |
| | | C2 | 004 | 4 → 4 | — |
| | | C3 | 003 | 3 → 3 | — |
| | | C10 | 030 | 1 → 2 | — |
| | improper setting of halogen lamp | C4 | 005 | 1 | — |
| picture image fog | improper principal charge voltage | C5 | 006, 008, 009 | 2 → 1 | $V_n = ab$, $V_s = ab$, $D_s = ab$, $O_s = ab$ |
| | | C6 | 007 | 1 → 2 | — |
| | improper setting of halogen lamp | C7 | 010 | 1 | — |

Furthermore, the contents of the new case 040 are shown in Table 13.

TABLE 13 case 040

| condition before repair | $H_L$ = normal<br>$\beta$ = normal<br>$V_b$ = normal<br>$D_s$ = low<br>$\zeta$ = normal<br>$A_{sp}$ = normal | $D$ = normal<br>$V_n$ = low<br>$\gamma_0$ = normal<br>$V_t$ = low<br>$O_s$ = low<br>$S_p$ = normal | $X$ = high<br>$V_s$ = low |
|---|---|---|---|
| condition after repair | $H_L$ = normal<br>$X$ = normal<br>$V_n$ = normal<br>$V_b$ = normal<br>$D_s$ = normal<br>$\zeta$ = normal<br>$A_{sp}$ = normal | $D$ = normal<br>$\beta$ = normal<br>$V_s$ = normal<br>$\gamma_0$ = normal<br>$V_t$ = normal<br>$O_s$ = normal<br>$S_p$ = normal | |
| fault symptom | picture image density low | | |
| fault | improper principal charge voltage | | |
| repair work | 3, 2 | | |
| number of times of success in application | 1 | number of times of failure in application | 0 |

When the conditions of parameters before repair in the case 040 shown in this table 13 are compared with the conditions of the parameters before repair in the case 001 (see Table 4), the case 040 differs from the case 001 in that a parameter $V_t$=low. Therefore, in applying this case 040, the parameter $V_t$ must be first changed from "low" to "normal". Accordingly, the numbers of work "3, 2" are mentioned in the item of "repair work" in this case 040.

Thereafter, an operation of assigning priorities to classes (2) is executed (step S50), so that the processing is terminated.

Figure 20:
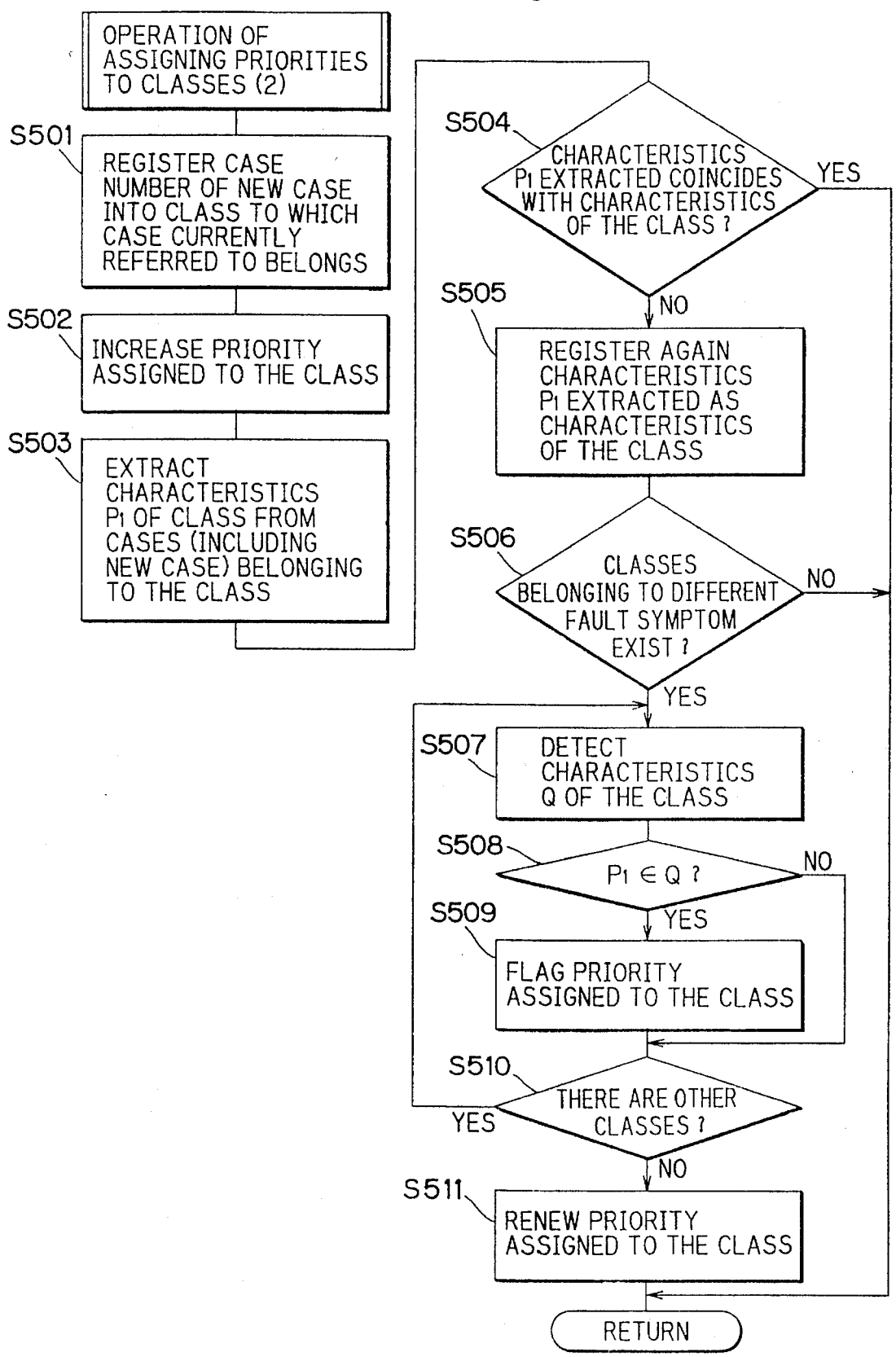
FIG. 20 is a flow chart showing processing for "an operation of assigning priorities to classes (2)" in one embodiment of the present invention.

The specific procedure for the operation of assigning priorities to classes (2) in step S50 will be described with reference to FIG. 20 as well as Table 12 and Table 13.

In the operation of assigning priorities to classes (2), the new case 040 created is registered in the class C1 to which the case currently being referred to, for example, the case 001 belongs (step S501). As shown in Table 12, "040" is added to "001, 002" in the item of "case number" of the class C1.

Repair processing succeeded as a result of applying this new case 040 this time. Accordingly, the class C1 containing this new case 040 is assigned the highest priority. That is, "2" in the item of "priority" in the class C1 is reloaded with "1" (step S502).

Furthermore, priorities assigned to the remaining classes C2, C3 and C10 belonging to the same "fault" as the fault to which the class 1 belongs are sequentially shifted as the priority assigned to the class C1 is shifted to "1". As a result, the priority assigned to the class C2 remains "4", the priority assigned to the class C3 remains "3", and the priority assigned to the class C10 is shifted from "1" to "2".

The conditions before repair in the respective cases (including the new case) belonging to the class C1 to which the new case is added and registered this time, for example, the three cases 001, 002 and 040 in this concrete example are inquired, and characteristics $P_1$ of this class C1 are extracted (step S503).

A method of extracting the characteristics $P_1$ is the same as the method of extracting the characteristics described above. Description is made again with reference to a concrete example. The conditions of parameters stored in the item of "condition before repair" in the case 001 shown in Table 4, the case 002 shown in Table 5, and the case 040 shown in Table 13 are compared with each other. Parameters which are not normal, that is, parameters which are low or high are extracted, and parameters common to the cases 001, 002 and 040 out of the parameters extracted are extracted as parameters constituting the characteristics $P_1$. Specifically, parameters $V_n$, $V_s$, $D_s$ and $O_s$ are extracted as parameters constituting the characteristics $P_1$. The parameters constituting the characteristics $P_1$ are registered as characteristics of the class C1 shown in Table 12.

It is then judged whether or not the characteristics $P_1$ extracted this time coincide with the characteristics P already registered as the characteristics of this class C1. The characteristics P of the class C1 previously registered are $V_n$, $V_s$, $D_s$, $O_s$ and $S_p$, as shown in Table 3, and do not coincide with the characteristics $P_1$ extracted this time in that they include $S_p$. Accordingly, in this concrete example, it is judged in step S504 that the inquiry is answered in the negative.

In this case, the characteristics of the class C1 are reloaded with the characteristics $P_1$ extracted this time, as shown in Table 12. That is, the characteristics $P_1$ extracted this time are registered again as the characteristics of the class C1 (step S505).

It is then judged whether or not there are classes belonging to a fault symptom different from the fault symptom "picture image density low" to which the class C1 belongs (step S506). In this concrete example, classes C5, C6 and C7 belonging to the fault symptom "picture image fog" exist as classes belonging to a different fault symptom, as shown in Table 12. In the concrete example, therefore, it is judged in step S506 that the inquiry is answered in the affirmative.

In this instance, the characteristics of the classes C5, C6 and C7 are sequentially compared with the above described characteristics $P_1$ of the class C1.

Specifically, the characteristics Q of the class C5 are first detected (step S507). The characteristics Q are such contents that the parameters $V_n$, $V_s$, $D_s$ and $O_s$ are not normal, as shown in Table 12.

The characteristics $P_1$ of the class C1 are then compared with the characteristics Q of the class C5, and it is judged whether or not the characteristics P are similar to the characteristics Q (step S508). In this concrete example, the characteristics $P_1$ are constituted by the parameters $V_n$, $V_s$, $D_s$ and $O_s$, and the characteristics Q are constituted by the parameters $V_n$, $V_s$, $D_s$ and $O_s$. Accordingly, $P_1$=Q. Consequently, the characteristics $P_1$ are similar to the characteristics Q. Therefore, the priority assigned to the class C5 is flagged (step S509).

It is then judged whether or not there are other classes to be processed (step S510). The classes to be processed include C6 and C7 in addition to the class C5. The classes are sequentially processed in accordance with steps S507 to S510. Only one case belongs to each of the classes C6 and C7. Accordingly, each of the classes C6 and C7 has no characteristics, so that the priority assigned to the class is not flagged.

In step S511, the flagged priority assigned to the class C5 and the priority assigned to the class C6 which belong to the fault "improper principal charge voltage" are then renewed. Specifically, the class C5 having the characteristics Q similar to the characteristics $P_1$ is assigned the highest priority. The priority assigned to the class C5 is changed from "2" to "1" and correspondingly, the priority assigned to the class C6 is changed from "1" to "2".

In the above described manner, the priority assigned to the class C1 to which the case which is successfully applied this time belongs is increased, and the priority assigned to a class having characteristics similar to those of the case which is successfully applied this time is increased out of the classes belonging to a fault symptom different from the fault symptom to which the case belongs. As a result, it is possible to improve case retrieval efficiency utilizing the "class". The reason for this is that the classification of cases according to the "class" exceeds a category obtained by the classification of cases according to the "fault symptom" and the "fault", that is, the classification of cases based on the QMS processing. Accordingly, cases having common characteristics out of cases classified using another classifying method exceeding the category are moved up in the order of priority concerning application of cases. Therefore, it is possible to efficiently cope with the phenomenon frequently occurring in the actual mechanical system that different fault symptoms appear, although a fault is due to the same fundamental cause.

Furthermore, in the processing for determining a case to be applied as described with reference to FIG. 17, the parameters of the apparatus are compared with the parameters before repair in the cases in step S222 and consequently, a case in which the degree of coincidence of the conditions of parameters is low in the same class is eliminated in step S223. The same is true for the processing for determining a case to be applied shown in FIG. 8.

However, the processing for determining a case to be applied is not limited to the same. For example, the processing performed in step S223 for eliminating a case in which the degree of coincidence of the conditions of parameters is low in the same class may be omitted. That is, in the processing for determining a case to be applied as shown in FIG. 17 or 18, the processing in step S223 may be omitted. When the processing in step S223 is omitted, the case to be applied may, in some instances, include a plurality of cases belonging to the same class. In this situation, therefore, every time the case previously applied failed, it may be determined whether or not the case subsequently applied belongs to the same class as the class to which the unsuccessful case previously applied belongs. Specifically, a slight correction may be made in the processing in the step S30 and the subsequent steps shown in FIG. 14, and a slight correction may be made in the processing in the step S62 and the subsequent steps shown in FIG. 16.

Figure 21A:
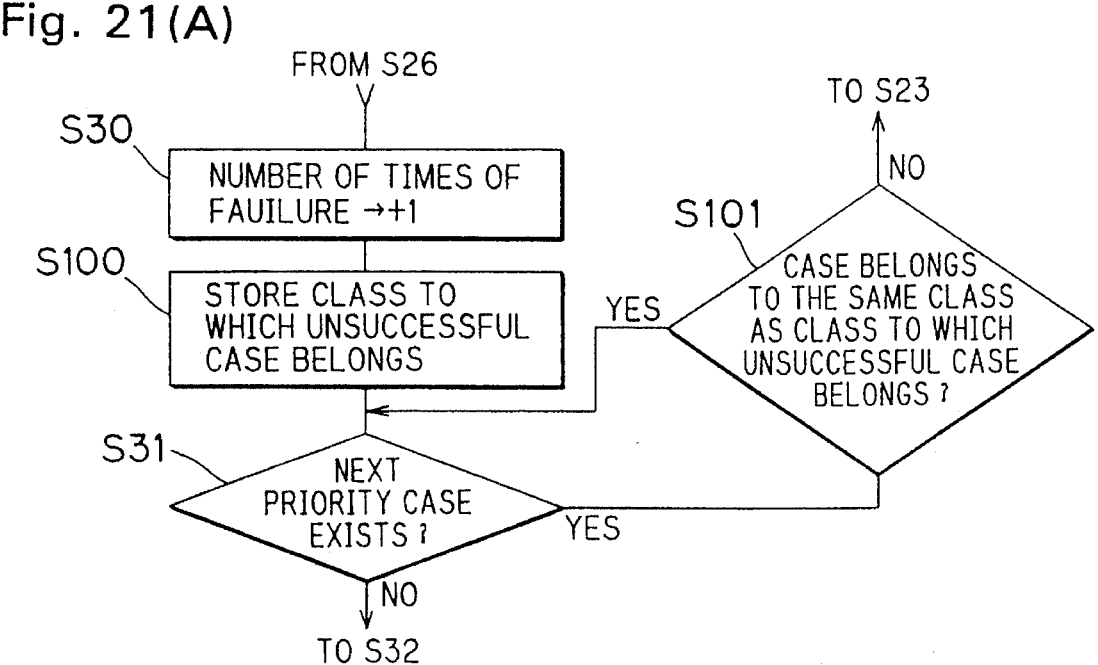
FIG. 21A and FIG. 21B are partial flow charts for explaining another control for setting the number of cases to be applied to only one for each class in one embodiment of the present invention.
Figure 21B:
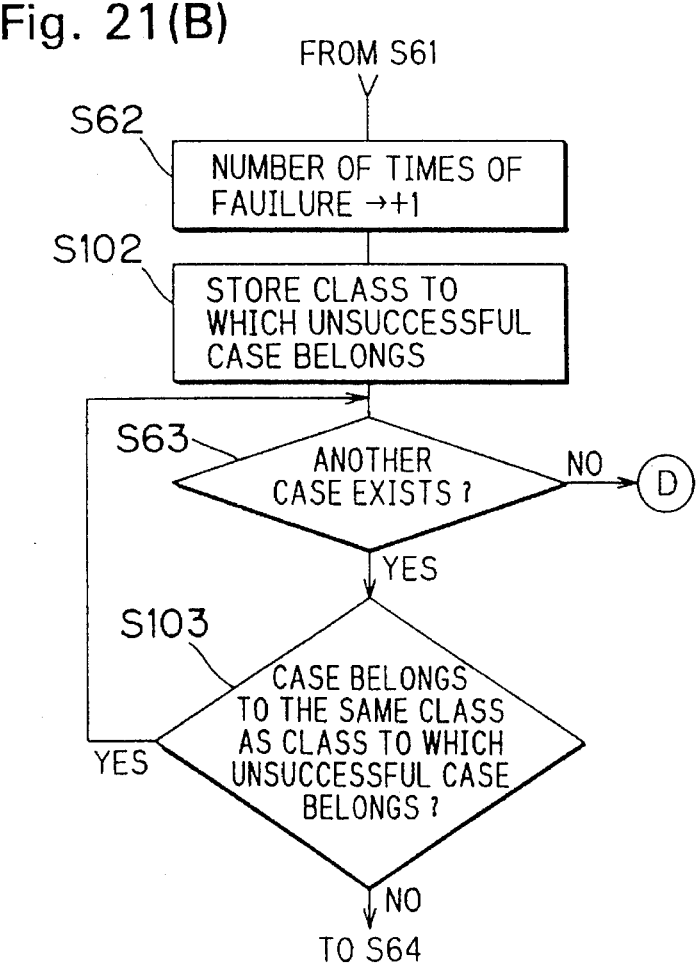

FIG. 21(A) and FIG. 21(B) show concrete examples of processing for making a correction. Description is made with reference to FIG. 21A. The number of times of failure is renewed in the step S30 and then, a class to which an unsuccessful case belongs is stored in a buffer memory or the like (step S100). Thereafter, it is judged whether or not a case assigned the next priority exists (step S31). If the next priority case exists (YES in the step S31), it is judged whether or not the next priority case belongs to the same class as the class to which the unsuccessful case belongs (step S101). If the next priority case does not belong to the same class as the class to which the unsuccessful case belongs, the processing proceeds to the step S23 (see FIG. 14). On the other hand, if the next priority case belongs to the same class as the class to which the unsuccessful case belongs, the processing is returned to the step S31. In the step S31, it is judged whether or not there is a case assigned the priority subsequent to the priority assigned to the next priority case. In such a manner, immediately before a case is applied, it is judged whether or not the case to be applied belongs to the same class as the class to which the unsuccessful case belongs. If the case belongs the same class, the application of the case is omitted. Similarly, referring to FIG. 21(B), processing for increasing the number of times of failure is performed in step S62 and then, a class to which an unsuccessful case belongs is stored in the buffer memory or the like (step S102). It is judged whether or not another case, that is, a case assigned the next priority for application exists. If the next priority case exists (YES in step S63), it is judged whether or not the next priority case belongs to the same class as the class to which the unsuccessful case belongs which is stored in step S102 (step S103). If the next priority case does not belong to the same class as the class to which the unsuccessful case belongs, the processing proceeds to step S64 (see FIG. 16). On the other hand, if the next priority case belongs to the same class as the class to which the unsuccessful case belongs, the processing is returned to step S63. In step S63, it is judged whether or not there is a case assigned the priority subsequent to the priority assigned to the next priority case. As a result, immediately before a case is applied, it is judged whether or not the case belongs to the same class as the class to which the unsuccessful case belongs. If the case belongs to the same class, the application of the case is omitted.

In performing the repair work, the use of the above described method of retrieving cases and applying cases is particularly effective for an apparatus such as a small-sized plain paper copying machine as described in the foregoing concrete example. The reason for this is that the apparatus represented by the small-sized plain paper copying machine has in its composition system unstable elements (for example, positive utilization of the chemical change) as a control object. Therefore, the relationship between parameters of sensors and between parameters of actuators may be changed depending on the change of the state where the composition system is placed, for example, the change in environment and the structural degradation. The cases are retrieved in the above described concrete example in such a manner that the apparatus collects such a change between the parameters during running, one type of study using the change is conducted, and knowledge is tuned. Accordingly, even if the above described change between the parameters occurs, repair work which effectively copes with the change can be performed. That is, when the relationship between the parameters of the objective machine is changed, the case is corrected on the basis of the change and a new case is created. In addition, the contents of the work script are corrected.

Inference of repair plan

Description is now made of a method of the QMS processing in step S32 shown in FIG. 14 and inference of secondary effects in the processing.

As a result of the distinction between faults, "picture image density low ($O_s$=low)" is taken up as a fault symptom. Accordingly, the target of repair is to increase $O_s$.

Therefore, such an inference can be drawn from the relationship on the mathematical model shown in FIG. 10 that $O_s$ can be increased, which is the target of repair, by increasing $D_s$, by increasing $V_t$, or by increasing $\zeta$.

When the inference is then drawn with increasing $D_s$ as the target, any one of such conclusions is obtained that $V_s$ is increased, $V_b$ is decreased, and $\gamma_O$ is increased. It is thus possible to obtain on the mathematical model candidates of a repair operation by repeating the inference on the basis of the mathematical model. The obtained results are shown in Table 14.

TABLE 14

| | |
|---|---|
| $H_L$ = decrease | $V_b$ = decrease |
| D = increase | $\gamma_0$ = increase |
| X = decrease | $D_s$ = increase |
| β = decrease | $V_t$ = increase |
| $V_n$ = increase | $\zeta$ = increase |
| $V_s$ = increase | |

Meanwhile, some repair candidates obtained on the basis of the mathematical model may be realized, whereas others may not be realized. For example, D: Optical density of an original cannot be altered, and β: Sensitivity of a photosensitive substance is also difficult to alter.

$\gamma_O$: Sensitivity of toner is neither alterable, and $\zeta$: Sensitivity of paper is nor alterable.

Furthermore, in this concrete example, $V_b$: Bias voltage is not also alterable because there is no actuator. It goes without saying that $V_b$ is made alterable by adding an actuator.

Additionally, the following are not made alterable but are only indirectly altered by altering another parameter and thus, are excluded from the repair candidates:

X : Logarithm of copy reflected quantity of light $V_s$: Surface potential of drum after exposure $D_s$: Toner density on drum Meanwhile, the following, which is not directly related in this concrete example, can be altered by adding an actuator:

$A_{sp}$: Amplitude of separating AC voltage

In the above described manner, the following are taken up as the repair candidates in this concrete example:

$V_t$: Transfer voltage $V_n$: Surface potential after principal charge $H_L$: Logarithm of halogen lamp output quantity of light On the other hand, the following knowledge is previously stored as repair plan knowledge in the objective model storage portion 14. That is:

(a) $V_t$ is increased.→The control voltage of the transfer transformer is increased.

(b) $V_t$ is decreased.→The control voltage of the transfer transformer is decreased.

(c) $V_n$ is increased.→The control voltage of the principal charge transformer is increased.

(d) $V_n$ is decreased.→The control voltage of the principal charge transformer is decreased.

(e) $H_L$ is increased.→The halogen lamp control signal is shifted to the high voltage side.

(f) $H_L$ is decreased.→The halogen lamp control signal is shifted to the low voltage side.

The repair plan knowledge stored in the objective model storage portion 14 is characteristic data intrinsic to this apparatus. By applying the repair plan knowledge to the repair candidates obtained on the basis of the mathematical model, the following three methods are obtained as the repair operation for increasing $O_s$:

(a) $V_t$ is increased.→The control voltage of the transfer transformer is increased.

(c) $V_n$ is increased.→The control voltage of the charge transformer is increased (f) $H_L$ is decreased.→The halogen lamp control signal is shifted to the low voltage side.

If it is necessary to only increase the picture image density $O_s$, repair is possible by carrying out any one of the three methods.

It is considered, however, that the objective machine is subjected to a variety of secondary effects by increasing the picture image density $O_s$. In the present embodiment, therefore, an inference of the secondary effects is drawn on the basis of the mathematical model as described below.

Inference of secondary effects

Figure 22:
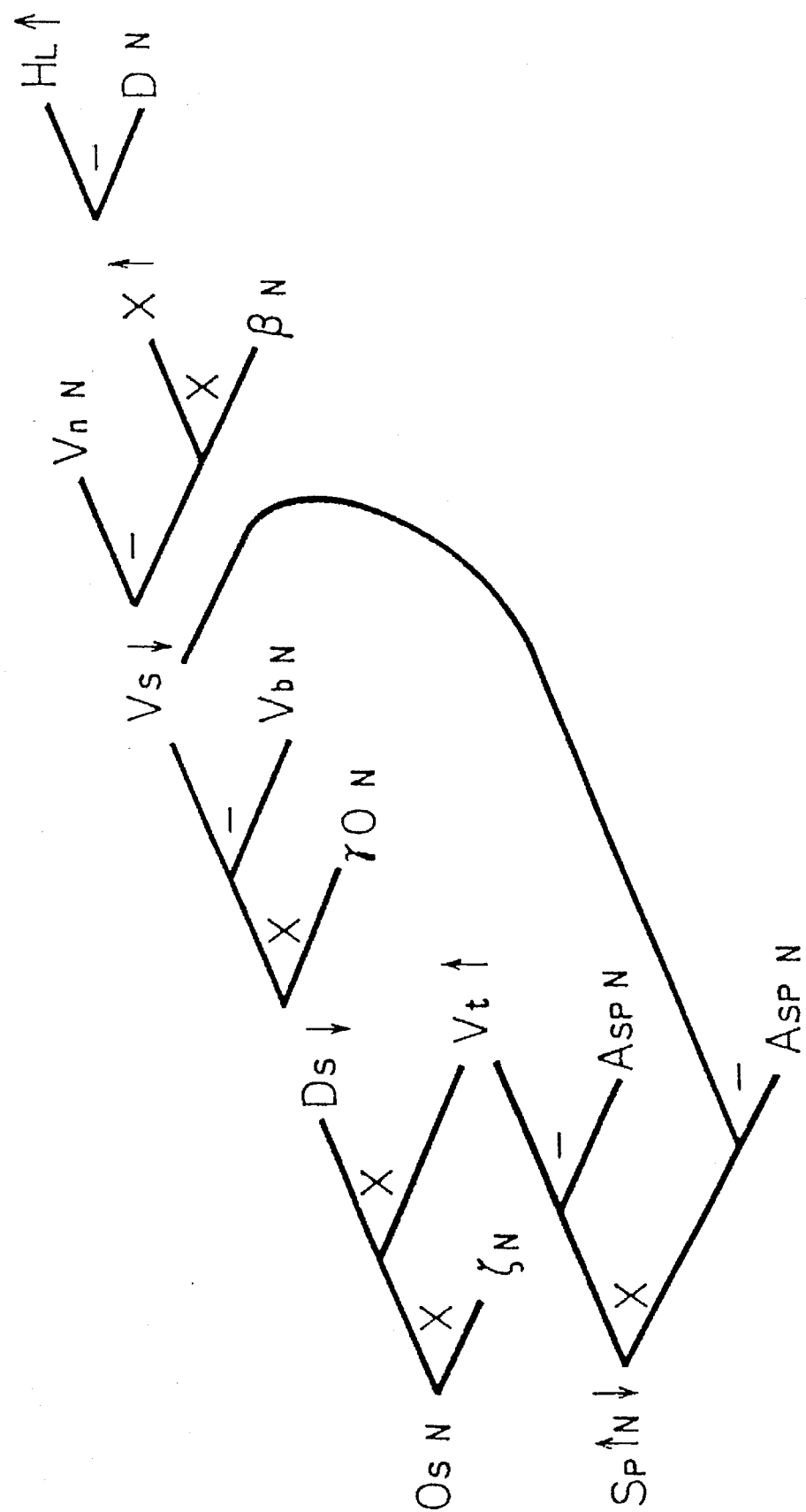
FIG. 22 is a diagram showing the development for inference of secondary effects on the above described mathematical model.
Figure 23:
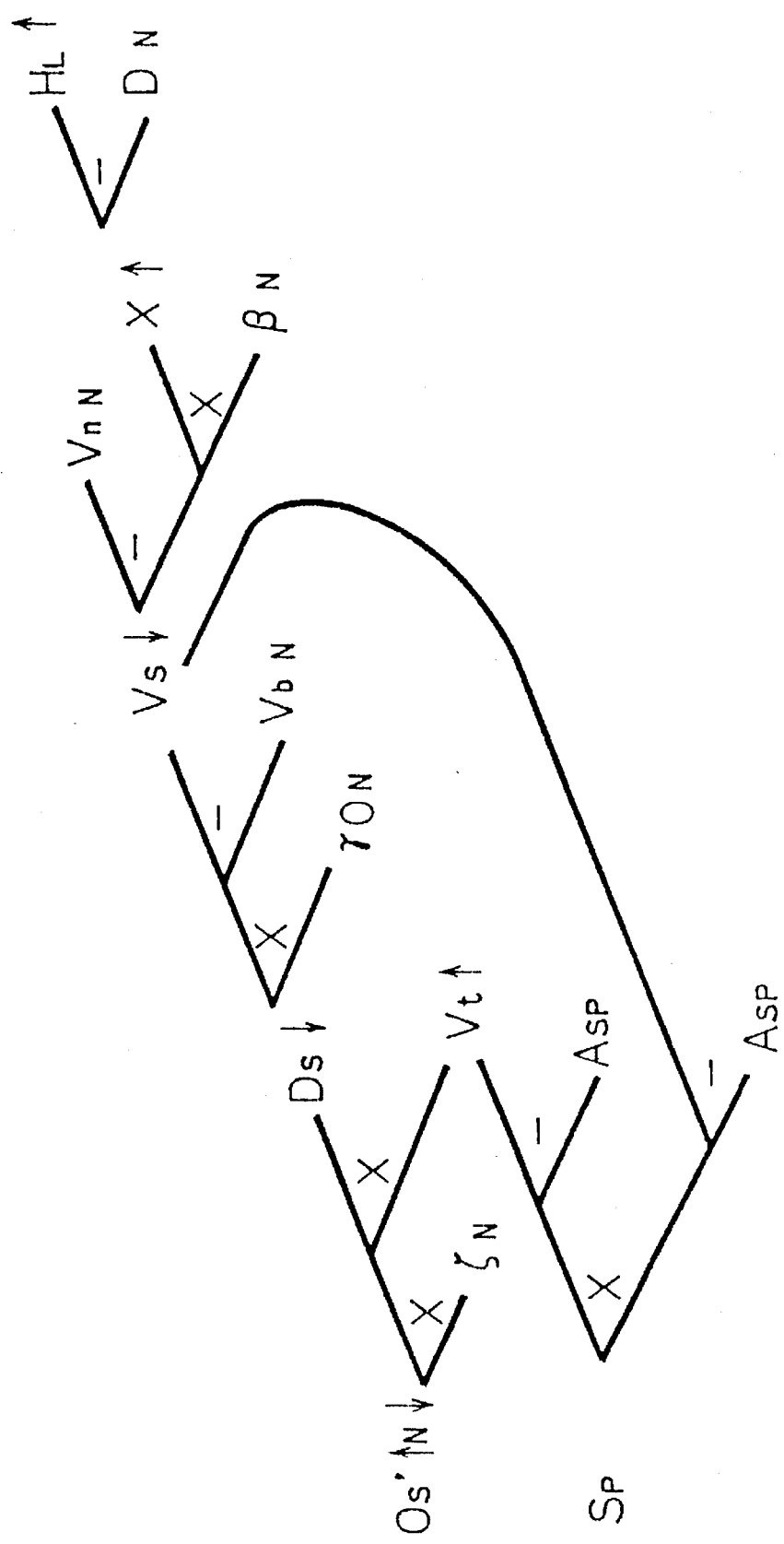
FIG. 23 is a diagram showing the development for inference of secondary effects on the above described mathematical model.
Figure 24:
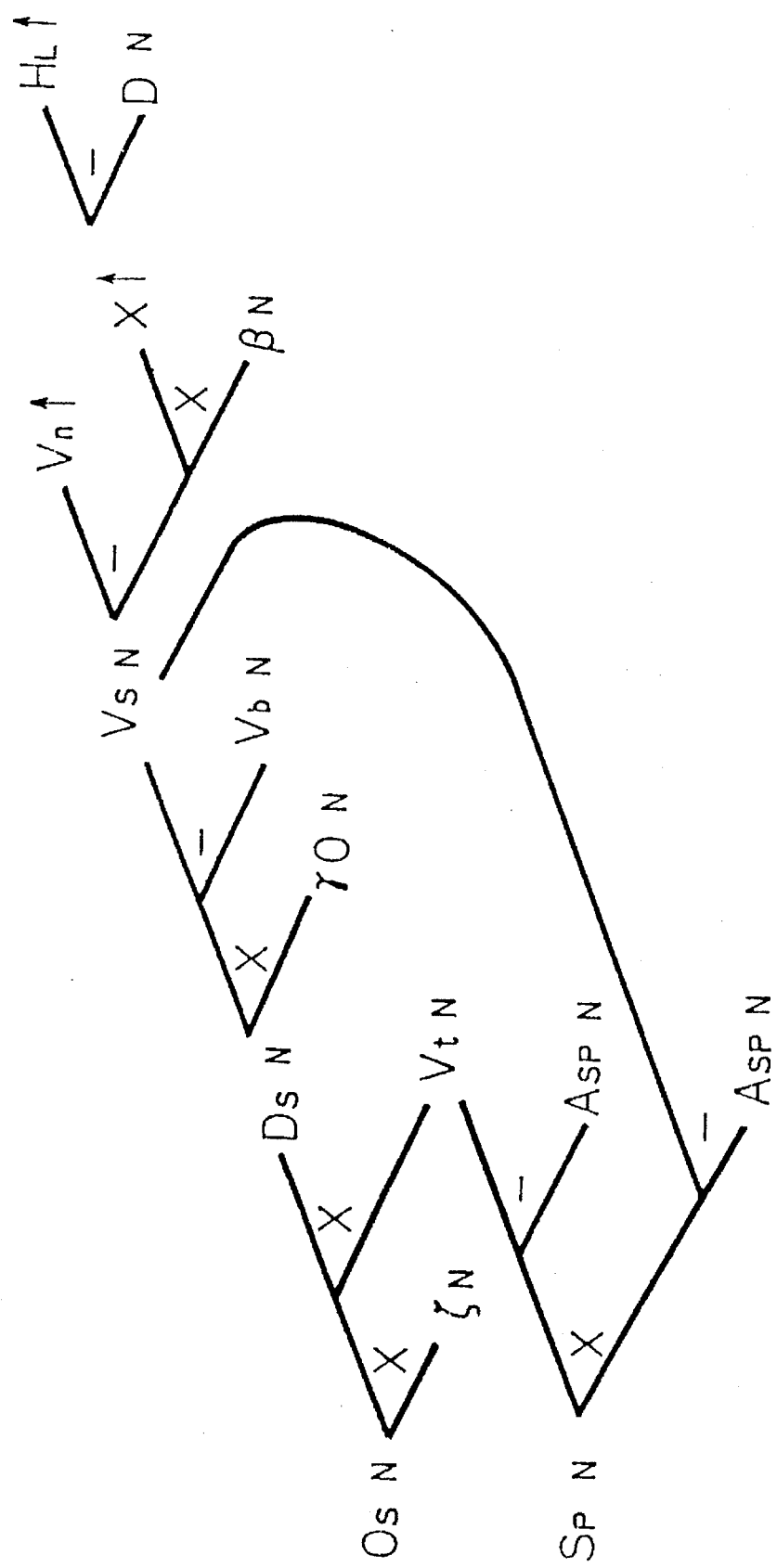
FIG. 24 is a diagram showing the development for inference of secondary effects on the above described mathematical model.
Figure 25:
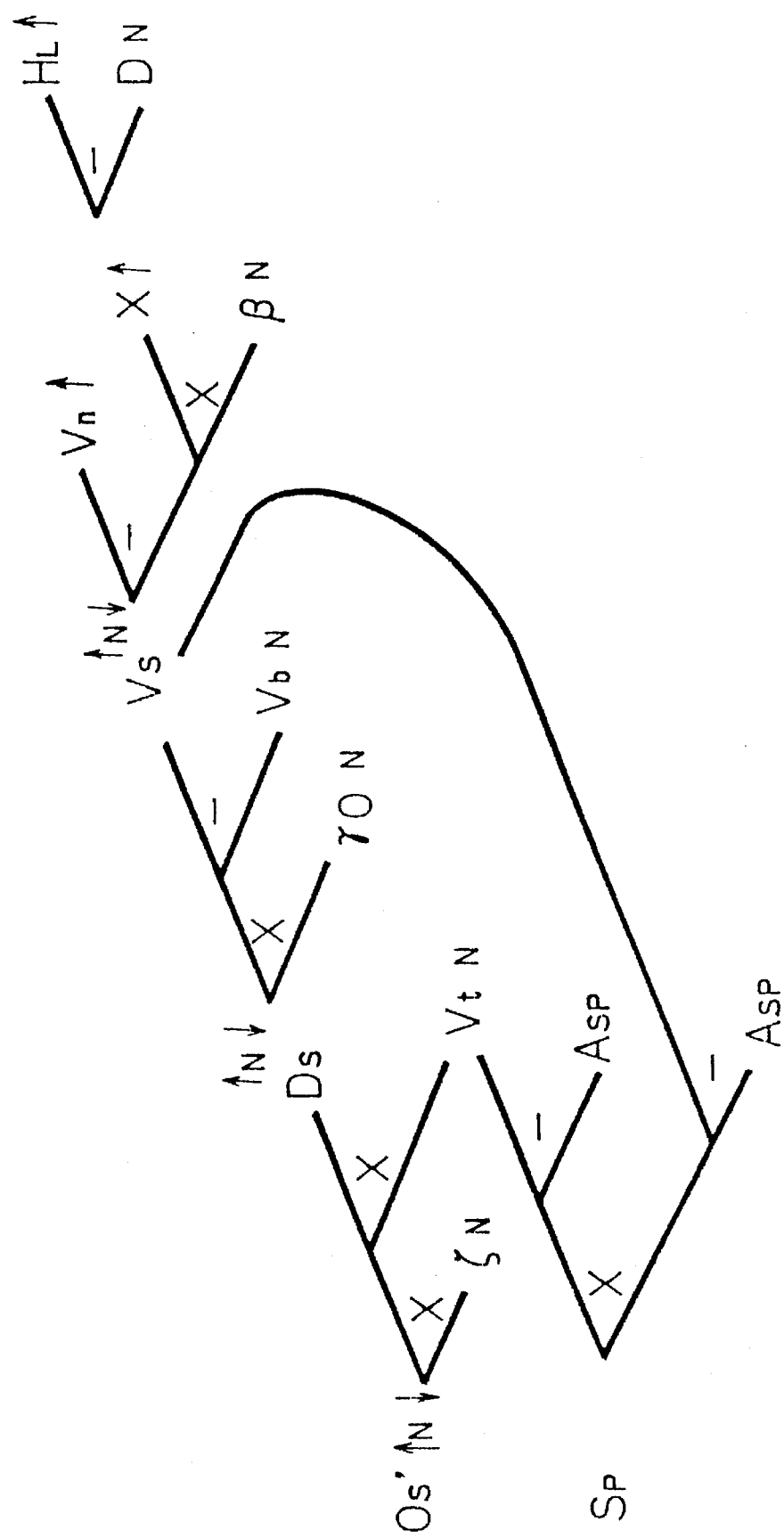
FIG. 25 is a diagram showing the development for inference of secondary effects on the above described mathematical model.
Figure 26:
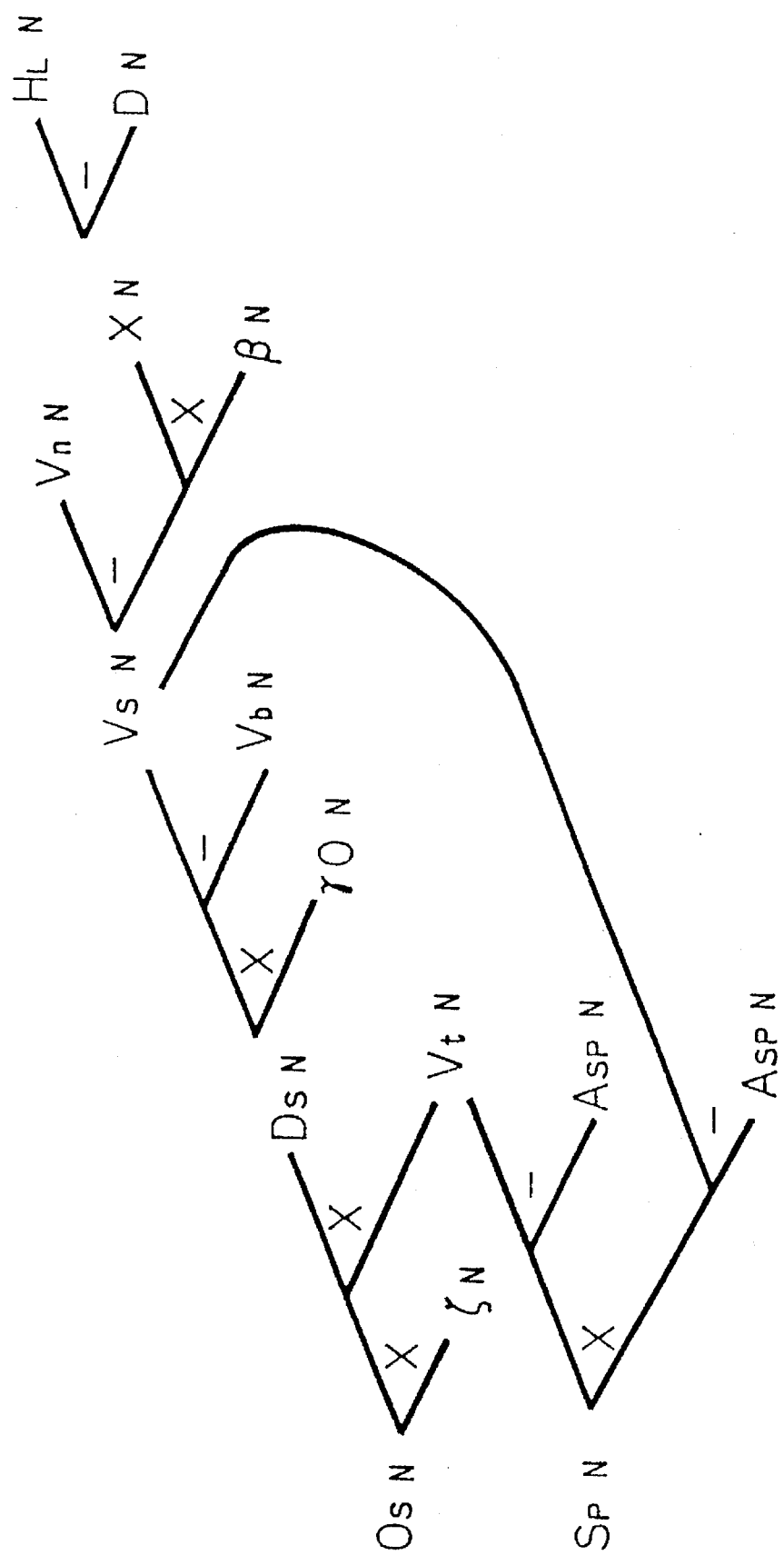
FIG. 26 is a diagram showing the development for inference of secondary effects on the above described mathematical model.
Figure 27:
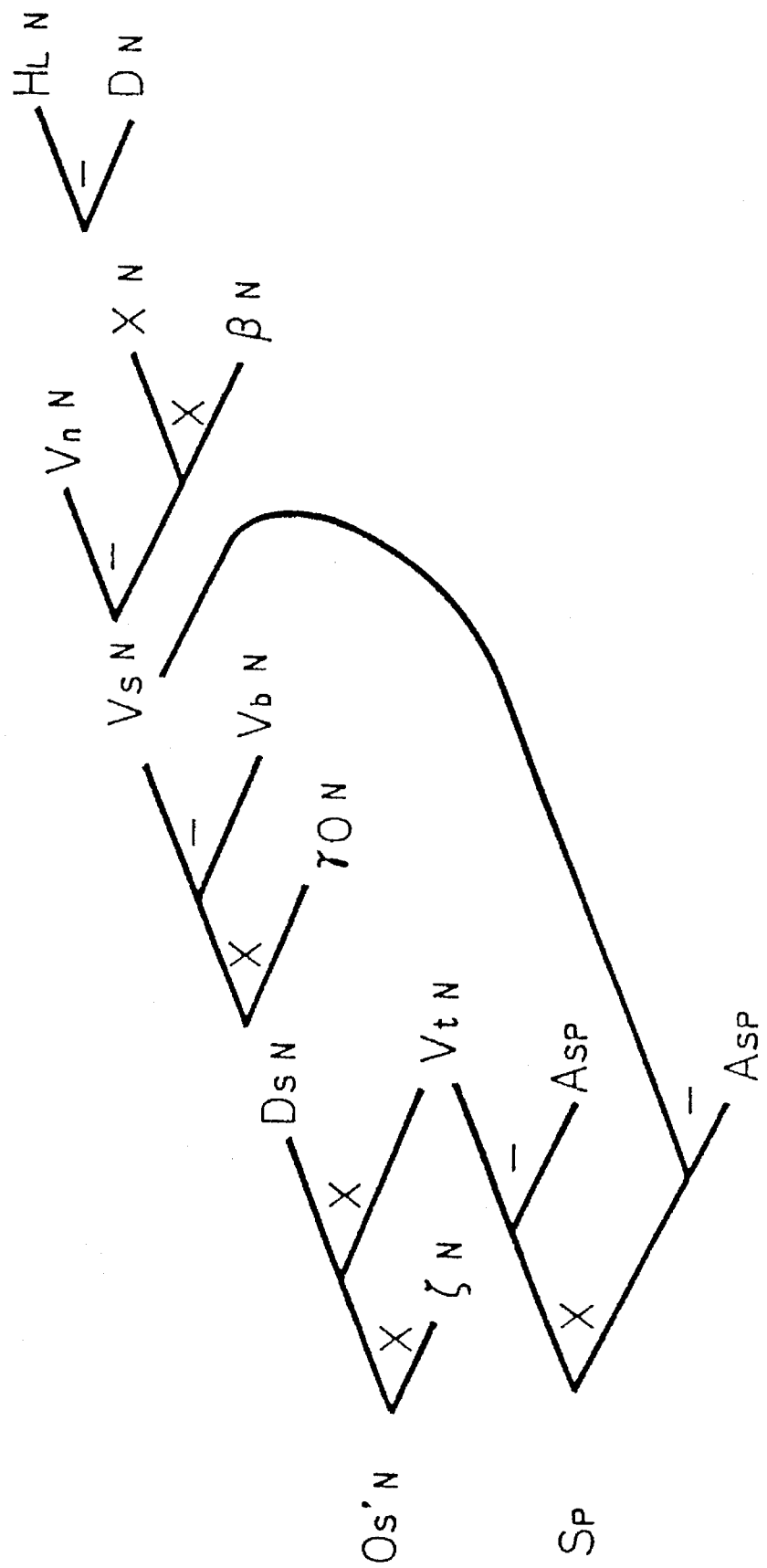
FIG. 27 is a diagram showing the development for inference of secondary effects on the above described mathematical model.

FIGS. 22 to 27 are obtained when three repair plans derived in the inference for the repair plan are developed on mathematical models. That is, the case (a) where $V_t$ is increased is shown in FIGS. 22 and 23 ($O_s'$ when D=0 is shown on the mathematical model in FIG. 23), and the case (c) where $V_n$ is increased is shown in FIGS. 24 and 25 ($O_s'$ when D=0 is shown on the mathematical model in FIG. 25), and a case (f) where $H_L$ is decreased is shown in FIGS. 26 and 27 ($O_s'$ when D=0 is shown on the mathematical model in FIG. 27).

When function evaluations are carried out on the basis of the mathematical models, an inference of the following states is drawn. That is;

(1) When $V_t$ is increased (FIGS. 22 and 23)

(a) The output picture image density is increased.

(b) $O_s'$>normal may, in some cases, be created when D=0. That is, there is a possibility that fog is generated.

(c) $S_p$>normal is created, so that there is a possibility that defective separation is performed.

(2) When $V_n$ is increased (FIGS. 24 and 25)

(a) The output picture image density is increased.

(b) $O_s'$>normal is created when D=0, so that there is a possibility that fog is generated.

(3) When $H_L$ is decreased (FIGS. 26 and 27)

(a) The output picture image density is only increased, and there are no other secondary effects.

Therefore, in the repair plan portion 15, the repair plan which is subjected to the least secondary effects, that is, to decrease $H_L$ is selected. This repair plan coincides with an operation for eliminating a fault obtained in fault diagnosis.

More specifically, from another point of view, an inference of the fault in the fault diagnosis is drawn by tracing on the mathematical model the actual state of the apparatus which failed and grasping the states of respective elements in a case where the apparatus failed, while inference in the repair plan is drawn by tracing on the mathematical model the state of the apparatus on the assumption that the apparatus is not faulty but normal and on the basis of the tracing. In the above described concrete example, both the inference in the fault diagnosis and the inference in the repair plan result in the same fault and repair plan.

However, the results obtained by both the inference in the fault diagnosis and the inference in the repair plan may, in some situations, differ from each other because the former is based on the assumption that the apparatus is in a faulty state, while the latter is based on the assumption that the apparatus is in a normal state. In such instances, only a conclusion which is not contradictory to the conclusion obtained in the process of the inference in the fault diagnosis may be selected at the time of the inference in the repair plan to perform inference processing in the repair plan in a shorter time.

In the above described case, if the repair plan to decrease $H_L$ cannot be selected, for example, if the lamp volume AVR for shifting the halogen lamp control signal to the low voltage side is already at the lowest limit, the repair plan (2) which is subjected to the next least secondary effects, that is, to increase $V_n$ is selected.

If the repair plan to increase $V_n$ is selected, however, a secondary effect, that is, the possibility of fog generation is forecast. Accordingly, it is examined on the basis of the mathematical model shown in FIG. 25 which parameter is to be operated so as to decrease $O_s'$, and an operation is selected on the basis of the repair plan knowledge. As a result, the following is selected:

whether $H_L$ is increased, whether $V_n$ is decreased, or whether $V_t$ is decreased, and a repair plan including prevention of fog generation is carried out.

Figure 28:
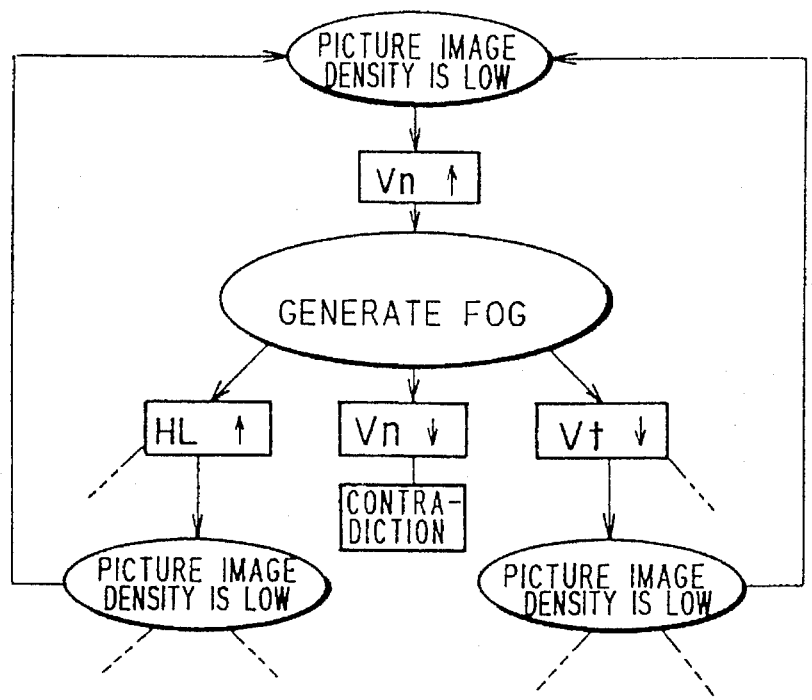
FIG. 28 is a diagram showing an operation of selecting a repair plan in one embodiment of the present invention.

More specifically, an inference in a repair operation is developed by assuming secondary effects as shown in FIG. 28. The development of the inference in the repair operation as shown in FIG. 28 is made on the basis of the following knowledge:

(a) Any branch which is contradictory to the previous repair plan on the mathematical model is not selected.

(b) That which is subjected to the least secondary effects is selected.

(c) That which has formed a loop stops being developed at that time point.

Figure 29:
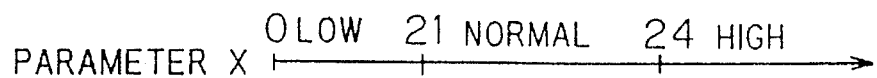
FIG. 29 is a diagram showing, in a case where reference value data shown in FIG. 11 is renewed as a result of performing an operation of selecting a repair plan, the renewed reference value data in one embodiment of the present invention.
Figure 29:
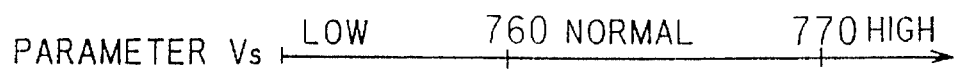
Figure 29:
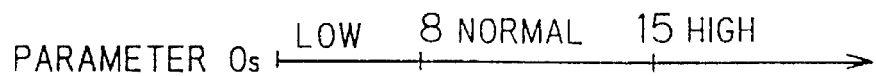
Figure 29:
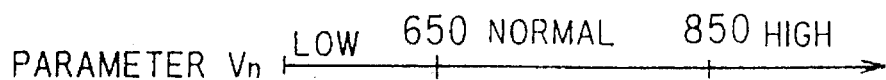

In FIG. 28, the following two repair plans are eventually left:

(1) a loop of $V_n\uparrow \rightarrow H_L\uparrow \rightarrow V_n\uparrow$, and (2) a loop of $V_n\uparrow \rightarrow V_t\uparrow \rightarrow V_n\uparrow$ In a case where the loop (1) is executed as a repair plan, it is assumed that the picture image density becomes proper, that is, $O_s$ becomes "normal". In such a case, parameters $V_n$ and $H_L$ are increased. Accordingly, in a state before repair where the picture image density $O_s$ is returned to "normal", the value of the surface potential measured by the sensor $1b$ should be changed to a value significantly higher than the value first measured. Since this means that the repair work succeeded, however, a parameter $V_s$ after repair must be symbolized by "normal". In such a situation, therefore, reference data for symbolizing the parameter $V_s$ shown in FIG. 11 is altered on the basis of the value measured by the sensor $1b$ at the time point where the repair is terminated, and is reloaded with data shown in, for example, FIG. 29. The reference data is thus renewed as required after the repair work is terminated.

In the present embodiment, when the above described loop (1) in FIG. 28 is executed, and specifically, the principal charge volume VR1 is operated to raise the surface potential of the photosensitive drum 21 so that fog is generated in a copy thus obtained, the lamp volume AVR is operated to increase the quantity of light of the halogen lamp so that the picture image density of the copy is decreased.

When the picture image density becomes normal, that is, when it is found from a detection output of the densitometer which is the sensor $1c$ that the parameter $O_s$ becomes "normal" while alternately increasing the principal charge volume VR1 and the lamp volume AVR, the repair processing is terminated.

Furthermore, if the above described two repair plans are impractical, the above described repair plan (3) to increase $V_t$ is further selected, and fault diagnosis assuming fog generation and defective separation which are its secondary effects is made, to thus select the repair plan.

If the selected repair plan is carried out, and in the case of loop processing, the judgment is made that the repair plan failed at the time point where the operation of parameters on the loop reaches its limit. Additionally, in the present embodiment, the termination of the repair is determined when $O_s$ becomes "normal", and the repair is stopped in the state, as described in the concrete example.

In the above described inference of the secondary effects, three repair plans derived in the inference in the repair plan are sequentially developed on the mathematical models. The inference of the secondary effects is drawn with respect to the respective repair plans collectively. Such a method of inferring the secondary effects may be replaced with the following processing.

More specifically, in the inference in the repair plan, it is assumed that three repair plans, for example, are derived. In such a case, only one of the three repair plans is taken up to simulate a secondary effect which may be caused when the actuator means is operated on the basis of the repair plan, and it is judged whether or not the secondary effect simulated can be removed by operating actuator means other than the actuator means selected by the repair plan. When it is judged that the secondary effect can be removed, the actuator means selected by the repair plan is actually operated to make the repair, and the secondary effect is removed by operating the other actuator means.

As a result, secondary effects based on the other two repair plans derived in the inference in the repair plan need not be simulated, thereby making it possible to shorten the time for the repair operation as a whole.

In the above described case, if the secondary effect is simulated with respect to the repair plan first selected and it is judged that the secondary effect simulated cannot be removed by operating the other actuator means, the first repair plan is abandoned and then, the second repair plan is taken up to simulate a secondary effect which may be caused when the actuator means selected on the basis of the second repair plan is operated, and it is judged whether or not the secondary effect simulated can be removed by operating actuator means other than the actuator means. When the secondary effect can be removed, repair work based on the second repair plan is performed.

Thus, a first repair plan out of a plurality of repair plans derived in the inference in the repair plan is taken out, and an inference of a secondary effect in the case is drawn. If the secondary effect can be removed, repair based on the first repair plan is immediately made.

If the secondary effect is too large in the repair plan, the repair plan is abandoned, and the next repair plan is selected to simulate a secondary effect in the case.

In such a case, it is preferable to judge in consideration of, for example, the fault causes obtained in the fault diagnosis which repair plan is to be first selected out of the plurality of repair plans derived in the inference in the repair plan.

In the above described embodiment, the repair itself is significantly restricted because the number of parameters of each actuator is small. However, it is possible to further improve the flexibility and the possibility of the repair by increasing the number of parameters of the actuator.

In the above described concrete example, if any repair work succeeds, it is judged that the apparatus after the success is in a normal state. Accordingly, it is preferable that the reference value data (a reference value shown in FIG. 11) of each parameter is renewed by the value of digital data applied from each sensor and the parameter is symbolized on the basis of new reference value data.

The others

Furthermore, in the above described concrete example, the operation range of each actuator is not particularly referred to. However, the operation range in which an output state of an actuator is stored can be utilized for judgment whether or not repair work is right provided that operation range data for setting the operation range of the actuator is included in the characteristic data intrinsic to the apparatus stored in the objective model storage portion 14. More specifically, it is judged that the actuator is operable when the actuator is within the operation range, while it is judged that the actuator is not operable when the actuator reaches the upper or lower limit of the operation range.

Additionally, although in the above described concrete example, a system of automatically making self-diagnosis and self-repair on the basis of the change of the sensor output is taken up, the image forming apparatus may be provided with a self-diagnosis mode setting key or the like so that self-diagnosis and/or self-repair can be made only when the self-diagnosis mode setting key is operated.

In the foregoing concrete example, description was made by taking up a completely autonomous system, that is, a system of automatically making self-diagnosis of the presence or absence of a fault and making self-repair of, if a fault exists, the fault without any operation of a serviceman and a user. According to the present invention, however, there can be provided an image forming apparatus capable of making non-autonomous self-diagnosis and making autonomous repair on the basis of the self-diagnosis by using such construction that sensors are eliminated from constituent elements of the apparatus so that a serviceman or the like can measure data in a function state in a predetermined portion of the apparatus and input the data measured to the apparatus.

Furthermore, there can be provided an image forming apparatus having a non-autonomous self-repair system by using such construction that an actuator for repairing a fault is only selected on the basis of the results of self-diagnosis made by the apparatus, the actuator is not actually operated, and an actuator to be operated is displayed so that it is only necessary that a serviceman operates the actuator displayed.

Additionally, in the present invention, only an actuator which is actually adjustable may be selected in consideration of the adjustable range of the actuator in making the inference in the repair plan.

More specifically, if an actuator is, for example, an AVR, the AVR is so constructed that its lower limit value and its upper limit value are respectively "0" and "100" and its set state can be detected by any one of the integers 1 to 100. In addition, the lower limit value "0" and the upper limit value "100" of the AVR are set in the objective model storage portion 14. Consequently, when the AVR is adjusted to enter a certain state, the adjusted state of the AVR is grasped as data of any one of the integers 0 to 100 which corresponds to the adjusted state.

In the repair plan portion 15, the adjusted state of the AVR is grasped by the data of any one of the integers 0 to 100 obtained depending on the adjusted state of the AVR, to judge whether or not the AVR can be selected as an actuator for fault repair. That is, the lower limit value and the upper limit value of the AVR which are stored in the objective model storage portion 14 are compared with the value of the present adjusted state thereof, to judge whether the AVR can be further operated in the direction of the lower limit or in the direction of the upper limit.

Accordingly, the results of the inference in the repair plan are output as a combination of actuator means which can be actually operated, thereby to make it possible to make practical inference in the repair plan by using the above described construction for a plurality of actuators or an arbitrary actuator thereof.

Meanwhile, the above described method of setting the operation range is one example. The operation range may be set by another method and compared with the actual state of an actuator.

Furthermore, the adjustable range and the value of the actual adjusted state of the set actuator are not only compared with each other in the repair plan portion 15 but also may be compared with each other and referred to in making fault diagnosis in the fault diagnosis portion 12.

Additionally, an image forming apparatus according to the embodiment of the present invention may be provided with, for example, a self-diagnosis mode setting key or switch which is manually operated as self-diagnosis mode setting means so that the above described self-diagnosis and/or self-repair can be made only when the self-diagnosis mode setting key or switch is operated.

The self-diagnosis mode setting key or switch may be arranged in an arbitrary position, which preferably is provided in a position different from that of an operation key or the like for normal image formation, for example, inside of the image forming apparatus so as to be operable with a front panel provided for the apparatus being opened.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A repair system for an image forming apparatus comprising:

case storing means for classifying cases into classes, which cases mention work for repairing one or more faults developed by the image forming apparatus, and storing the cases;

selecting and reading means for selecting and reading out, when the image forming apparatus develops a fault, a first case corresponding to the fault from the case storing means;

case correcting means for correcting the work mentioned in the first case to form a second case, when the first case cannot be directly applied to repair the fault by performing the work mentioned in the first case; and repair executing means for repairing a fault by applying the second case.

2. A repair system for an image forming apparatus according to claim 1, further including case registering means for registering the second case in a class to which the first case belongs, when the repair executing means successfully repairs the fault by applying the second case.

3. A repair system for an image forming apparatus according to claim 2, wherein the cases are classified into classes hierarchically depending on a fault symptom and a fault of the image forming apparatus.

4. A repair system for an image forming apparatus according to claim 2, wherein said case storing means includes priority storing means for storing priorities of application to a fault for each class of cases, and said selecting and reading means reads out the first case, when a plurality of cases which are equal in the degree of correspondence to the fault are stored in the case storing means, based upon an order in which said priority of application assigned is higher at the time of selecting the first case corresponding to the fault.

5. A repair system for an image forming apparatus according to claim 4, wherein a condition of the image forming apparatus at a time when the fault develops is expressed by a plurality of predetermined parameters, in each case, a condition of the image forming apparatus is mentioned by a plurality of the predetermined parameters, and the degree of correspondence between the fault and each case is determined based on the coincidence of the plurality of predetermined parameters of the image forming apparatus and the plurality of predetermined parameters in each case.

6. A repair system for an image forming apparatus according to claim 4, further including renewing means for renewing the priority of application for a class to which the first case stored in said priority storing means belongs, corresponding to a result of the fault repair, when the fault repair is made by applying the first case read out from said repair executing means.

7. A repair system for an image forming apparatus according to claim 6, further including retrieving means for retrieving one or more related classes relating to a class to which the first case applied by the repair executing means belongs, out of classes classified by said case storing means, and means for renewing the priority of application stored by said priority storing means for related classes retrieved by the retrieving means corresponding to a result of fault repair by the repair executing means.

8. A repair system for an image forming apparatus according to claim 1, further including work inferring means for inferring work to repair a fault using predetermined qualitative data for the image forming apparatus when fault repair is made by applying the second case but the work mentioned in the second case does not succeed in fault repair, means for performing the work inferred by the work inferring means, and registering means for registering a new third case mentioning the work inferred by the work inferring means in a new class, by making a category for a new class in said case storing means when fault repair succeeds as a result of performing the work inferred by the work inferring means.

9. A repair system for an image forming apparatus comprising:

case storing means for classifying cases into classes, which cases mention work for repairing a fault of the image forming apparatus, and storing the cases, selecting means for selecting one or more cases corresponding to a fault developed by the image forming apparatus, means for determining an order of application of cases when the selecting means selects a plurality of cases, applying means for applying a first case to fault repair according to an order determined by the means for determining the order for application by performing the work mentioned in the first case, and means for storing a class to which the first case belongs when fault repair does not succeed as a result of applying the first case and omitting application of any other case to fault repair thereafter when the other case belongs to the same class as the first case.

10. A repair system for an image forming apparatus according to claim 9, further including case correcting means for correcting work mentioned in the first case to form a second case when the first case cannot be directly applied to the fault for repair, case registering means for registering the second case in a class to which the first case belongs when the applying means successfully repairs the fault by applying the second case, and means for storing a class to which the second case belongs when fault repair does not succeed as a result of applying the second case and omitting application of any other case applied to the fault repair thereafter when the other case belongs to the same class as the second case.

11. A repair system for an image forming apparatus, said system comprising;

case storing means for storing and classifying cases into classes, each case specifying work to be performed to repair a fault in the image forming apparatus;

selecting means for selecting from the case storing means, when the image forming apparatus develops a fault, one or more cases corresponding to the developed fault; and repair executing means for applying the selected cases by performing the work specified by the selected cases.

12. The repair system according to claim 11, wherein cases are selected based upon a degree of correspondence to the developed fault.

13. The repair system according to claim 12, wherein a condition of the image forming apparatus at a time when the developed fault occurs is expressed as present values of a plurality of predetermined parameters.

14. The repair system according to claim 13, wherein each case includes preset values of the plurality of predetermined parameters, and the degree of correspondence between each case and the developed fault is determined based upon a coincidence of the present values and the preset values.

15. The repair system according to claim 12, wherein, when the degree of correspondence between two or more selected cases and the developed fault is equal, the repair executing means applies selected cases in order according to a priority assigned to each of the cases.

16. The repair system according to claim 15, wherein the priority assigned to each of the cases is based upon the number of past successes by the work identified in each case in repairing developed faults.

17. The repair system according to claim 15, wherein the priority assigned to each of the cases is based upon the number of past failures by the work identified in each case in repairing developed faults.

18. The repair system according to claim 15, wherein the priority assigned to each of the cases is based upon the number of past successes and the number of past failures in repairing developed faults by the work identified in each case.

19. The repair system according to claim 15, wherein the repair executing means applies only a single selected case from each class.

20. The repair system according to claim 12, wherein, when the degrees of correspondence between two or more selected cases and the developed fault are equal, the repair executing means applies selected cased in an order according to a priority assigned to each of the classes.

21. The repair system according to claim 20, wherein the priority assigned to each of the cases of each class is based upon the number of past successes in repairing developed faults by the work identified in each case.

22. The repair system according to claim 20, wherein the priority assigned to each of the cases in each class is based upon the number of past failures in repairing developed faults by the work identified in each case.

23. The repair system according to claim 20, wherein the priority assigned to each of the cases in each class is based upon the number of past successes and the number of past failures in repairing developed faults by the work identified in each case.

24. The repair system according to claim 20, wherein the repair executing means applies only a single selected case from each class.

25. The repair system according to claim 20, wherein the priority assigned to each of the classes is based upon a degree of similarity of each class to classes having cases which have been previously applied to successfully repair a developed fault.

26. The repair system according to claim 25, wherein
each case identifies image forming apparatus conditions before repair, and
the degree of similarity is based upon characteristics of each class,
the characteristics for a class being determined by the image forming apparatus conditions before repair commonly identified by each of the cases in the class.

27. The repair system according to claim 25, wherein only those classes having a plurality of cases may have characteristics.

28. The repair system according to claim 11, further including modifying means for modifying the work specified in a selected case when the selected case cannot be applied to successfully repair the developed fault.

29. The repair system according to claim 28, wherein the case storing means stores a new case with the work modified work.

30. The repair system according to claim 29, wherein the case storing means classifies the new case in a same class as the selected case.

31. The repair system according to claim 30, wherein, when a modified work cannot be performed to repair the developed fault, the repair executing means applies another selected case belonging to a class which is different from a class to which the selected case belongs.

32. The repair system according to claim 31, wherein each of the cases is assigned a priority, and the repair executing means applies the another case according to the priority assigned to the another case.

33. The repair system according to claim 31, wherein each of the classes are assigned a priority, and the repair executing means applies the another case according to a priority assigned to the class to which the another case belongs.

34. The repair system according to claim 11, wherein, when a first selected case applied by the repair executing means does not successfully repair a developed fault, the repair executing means will not thereafter apply a subsequent selected case from a class to which the first selected case belongs until the developed fault is successfully repaired.

35. The repair system according to claim 11, wherein, when no selected case can be applied to successfully repair a developed fault, the repair system infers a repair plan identifying work to be performed to repair the developed fault.

36. The repair system according to claim 35, wherein the repair system employs a qualitative model based method to infer the repair plan.

37. The repair system according to claim 35, wherein when work identified in the inferred repair plan is performed to successfully repair the developed fault, the inferred repair plan is stored in the case storing means as a new case.

38. The repair system according to claim 37, wherein the new case is classified in a new class.

39. The repair system according to claim 11, further including a plurality of actuators controlled by the repair executing means.

40. The repair system according to claim 11, wherein each case identifies a fault symptom;

a fault;

a condition of the image forming apparatus before repair of the fault;

a condition of the image forming apparatus after repair of the fault;

work to be performed when applying the case to repair the fault;

a number of times the case successfully has been applied to repair the fault; and a number of times the case unsuccessfully has been applied to repair the fault.

41. The repair system according to claim 11, further including work script storing means for storing work scripts identifying work for repairing a fault of said image forming apparatus, wherein the work specified in each case references work procedures included in an associated work script.

* * * * *